(12) United States Patent
Korcz et al.

(10) Patent No.: US 10,256,614 B2
(45) Date of Patent: Apr. 9, 2019

(54) ADJUSTABLE MUD RING ASSEMBLIES

(71) Applicant: Hubbell Incorporated, Shelton, CT (US)

(72) Inventors: Krzysztof Wojceich Korcz, Grainger, IN (US); Steven James Johnson, Buchanan, MI (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/535,599

(22) PCT Filed: Dec. 16, 2015

(86) PCT No.: PCT/US2015/066212
§ 371 (c)(1),
(2) Date: Jun. 13, 2017

(87) PCT Pub. No.: WO2016/100580
PCT Pub. Date: Jun. 23, 2016

(65) Prior Publication Data
US 2018/0013277 A1 Jan. 11, 2018

Related U.S. Application Data

(60) Provisional application No. 62/092,542, filed on Dec. 16, 2014.

(51) Int. Cl.
*H02G 3/12* (2006.01)
*H02G 3/18* (2006.01)

(52) U.S. Cl.
CPC ............. *H02G 3/126* (2013.01); *H02G 3/185* (2013.01)

(58) Field of Classification Search
CPC ............................... H02G 3/126; H02G 3/081
USPC ........................................................ 174/502
See application file for complete search history.

(56) References Cited

U.S. PATENT DOCUMENTS

| 5,224,673 A | 7/1993 | Webb |
| 5,931,325 A * | 8/1999 | Filipov ................. H02G 3/081 174/57 |
| 6,209,836 B1 | 4/2001 | Swanson |
| 6,666,419 B1 | 12/2003 | Vrame |

(Continued)

OTHER PUBLICATIONS

PCT/US2015/066212 International Preliminary Report on Patentability dated Jun. 20, 2017 (9 pages).

(Continued)

*Primary Examiner* — Dhiru R Patel
(74) *Attorney, Agent, or Firm* — Michael Best & Friedrich, LLP

(57) ABSTRACT

An adjustable mud ring assembly is provided that includes a base plate, a movable ring, and an indexing screw configured to move the movable ring with respect to the base plate between a first position and a second position. The base plate has a junction box connecting portion, a support connecting portion, and a stationary ring. The base plate can have an offset distance ($D_2$) between the junction box connecting portion and the support connecting portion where the offset distance is sufficient to allow the movable ring to move into stationary ring to the first position without protruding, at a lowermost point, into a junction box connected to the junction box connecting portion.

18 Claims, 22 Drawing Sheets

(56) References Cited

U.S. PATENT DOCUMENTS

| | | | |
|---|---|---|---|
| 6,820,760 B2 * | 11/2004 | Wegner | H02G 3/086 |
| | | | 174/57 |
| 7,025,314 B1 | 4/2006 | Thomas et al. | |
| 7,038,131 B1 | 5/2006 | Gretz | |
| 7,259,328 B1 | 8/2007 | Gretz | |
| 7,301,099 B1 | 11/2007 | Korcz | |
| 7,468,486 B2 | 12/2008 | Yan | |
| 7,531,743 B2 * | 5/2009 | Johnson | H02G 3/081 |
| | | | 174/53 |
| 7,645,936 B2 | 1/2010 | Magno, Jr. | |
| 7,824,213 B1 | 11/2010 | Korcz | |
| 8,076,577 B2 | 12/2011 | Magno, Jr. et al. | |
| 8,575,484 B1 | 11/2013 | Witherbee | |
| 8,680,394 B2 | 3/2014 | Korcz et al. | |
| 9,553,438 B2 * | 1/2017 | Korcz | H02G 3/185 |
| 2002/0157845 A1 | 10/2002 | Vrame et al. | |
| 2010/0108347 A1 | 5/2010 | Korcz et al. | |
| 2010/0218969 A1 | 9/2010 | Purves et al. | |
| 2010/0252552 A1 | 10/2010 | Nikayin et al. | |
| 2014/0202758 A1 | 7/2014 | Lolachi | |
| 2014/0238738 A1 | 8/2014 | Korcz et al. | |

OTHER PUBLICATIONS

PCT/US2015/006212 International Search Report dated Jul. 3, 2016 (3 pages).

* cited by examiner

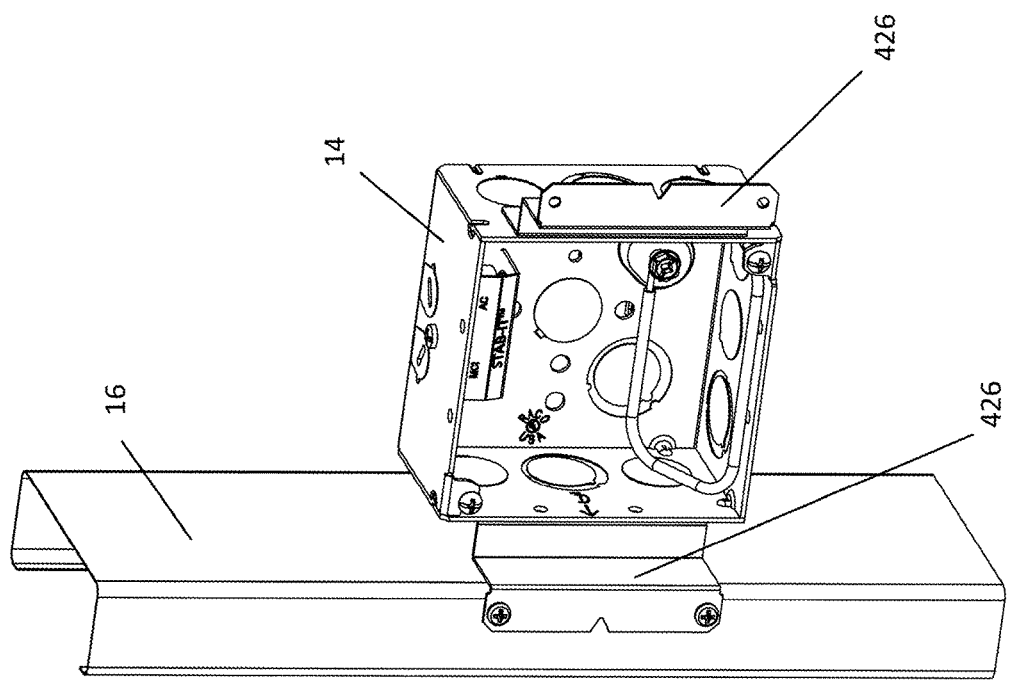

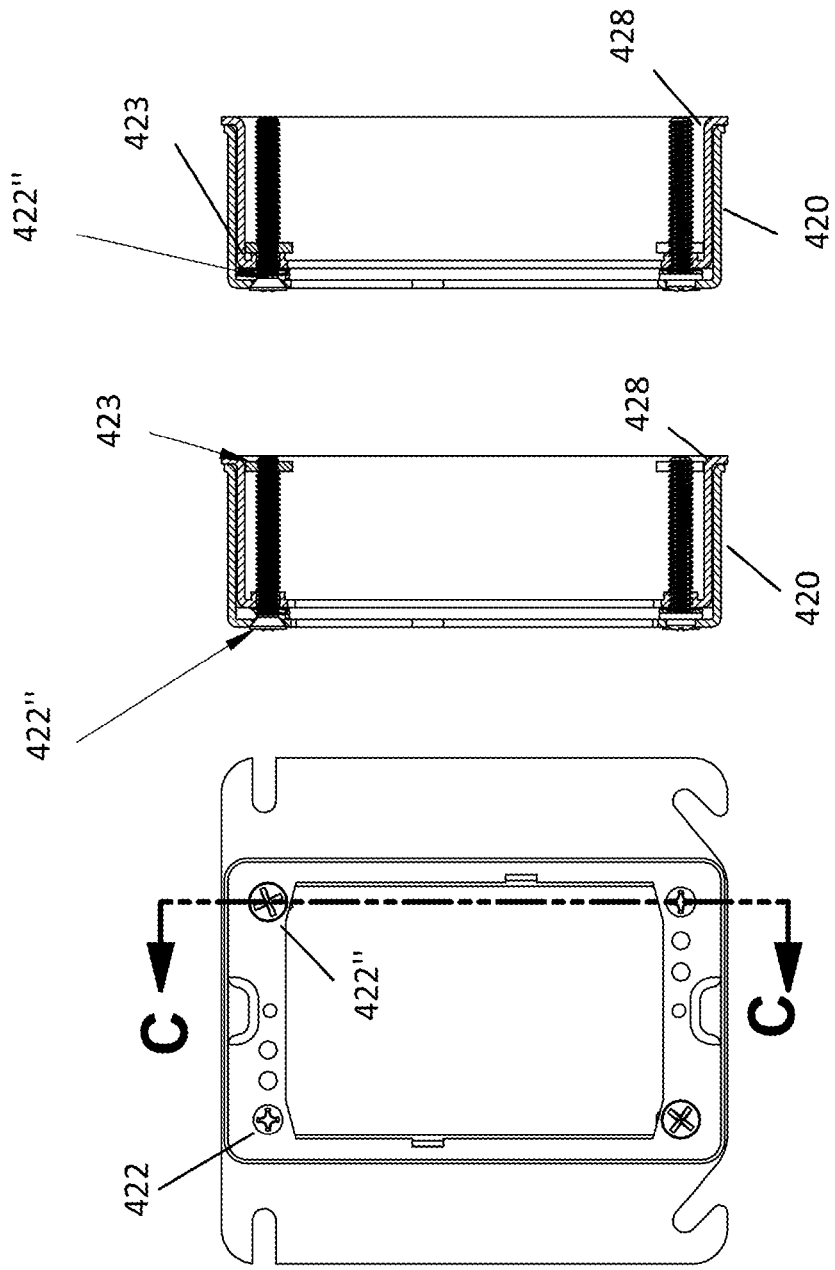

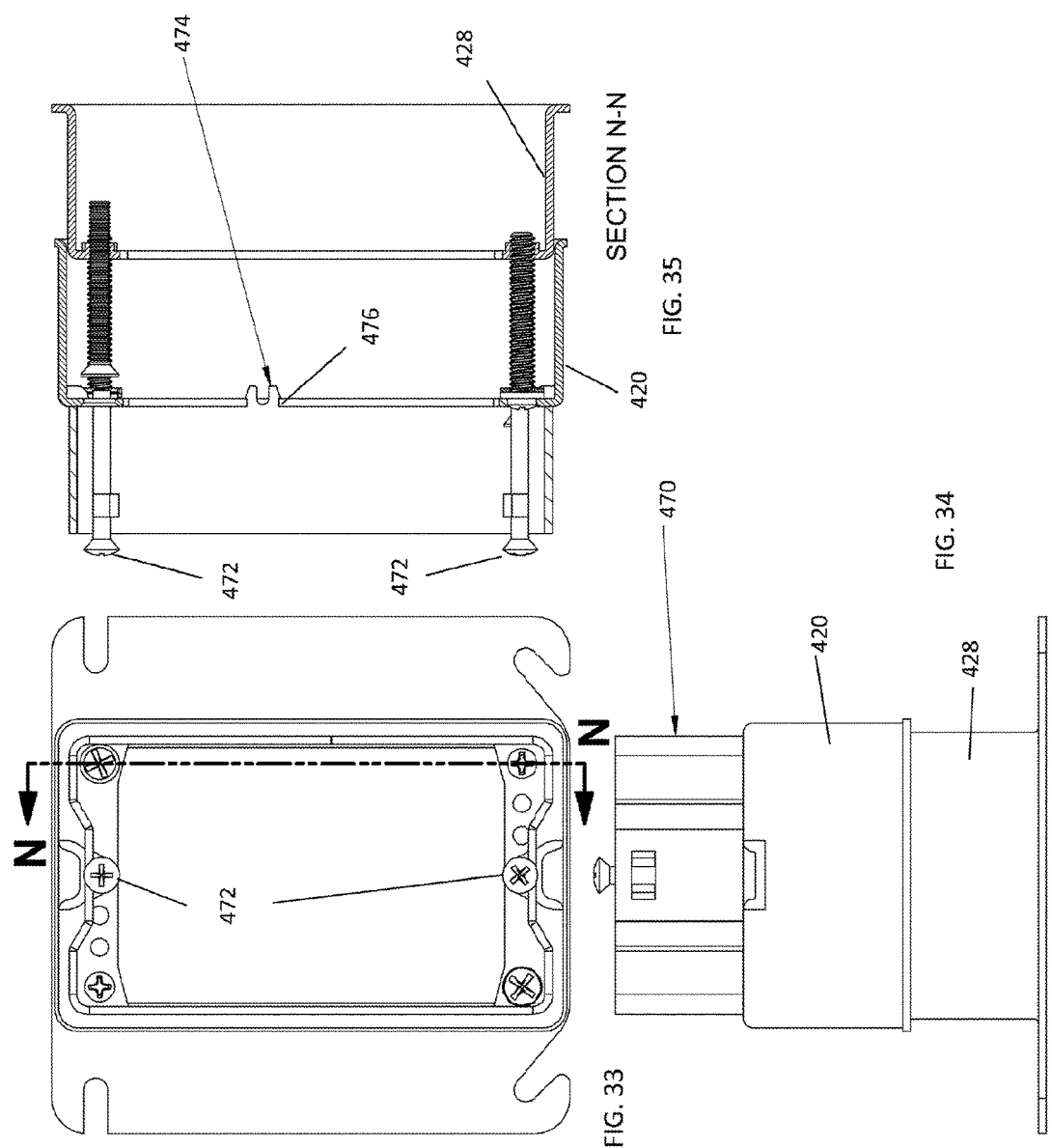

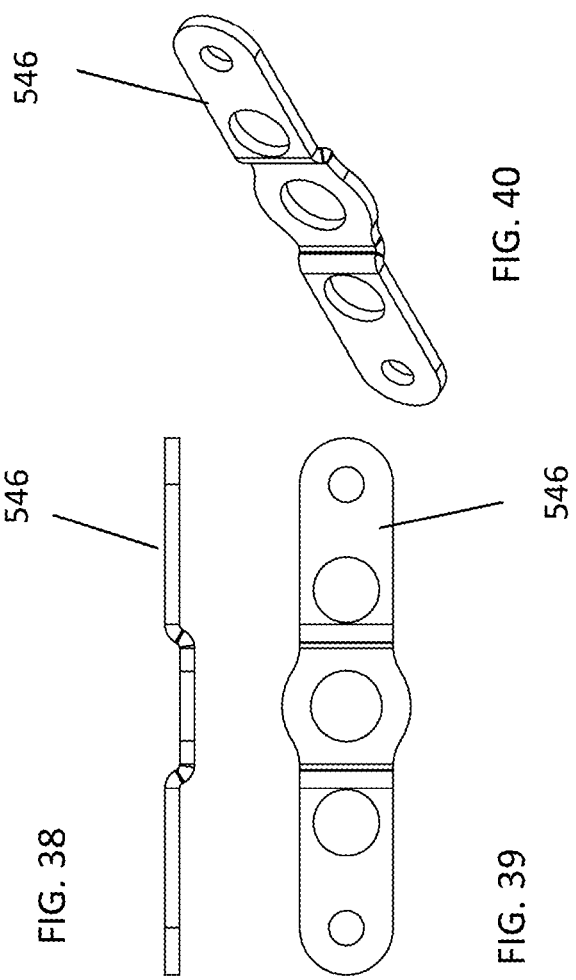

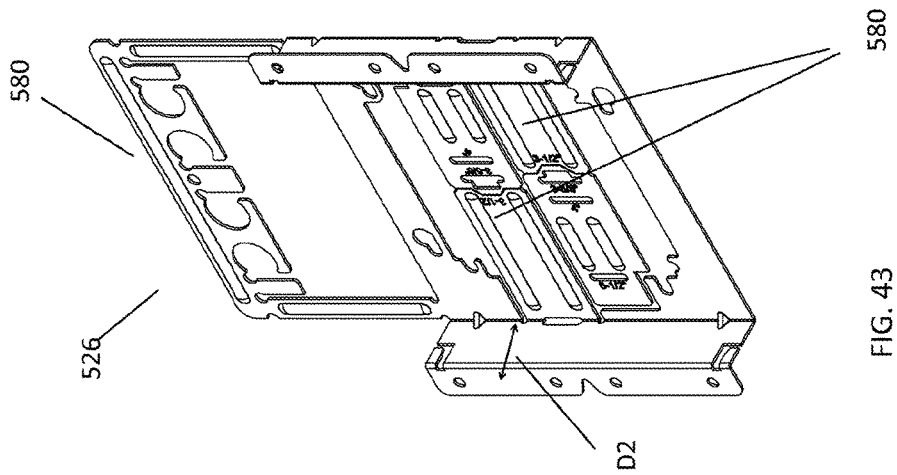
FIG. 43
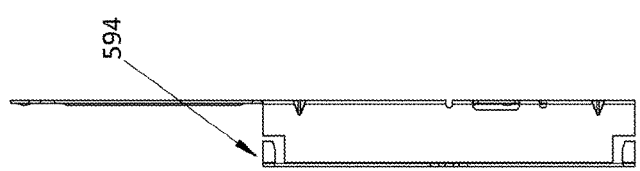
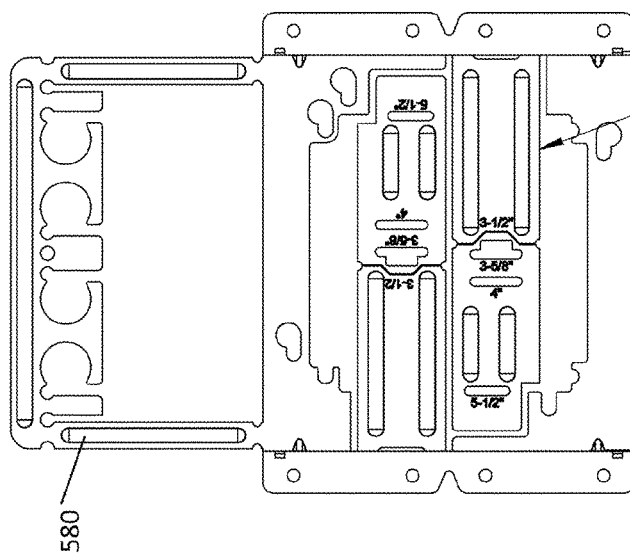
FIG. 44
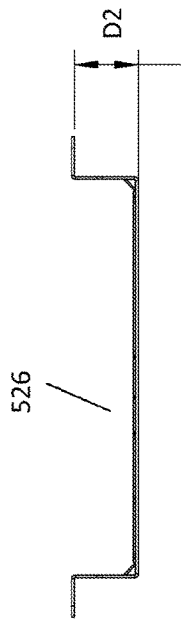
FIG. 45
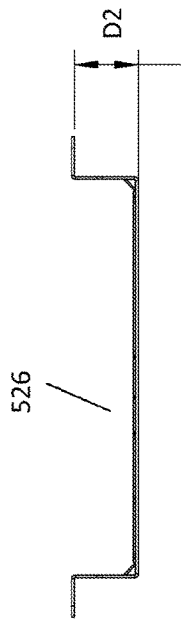
FIG. 46

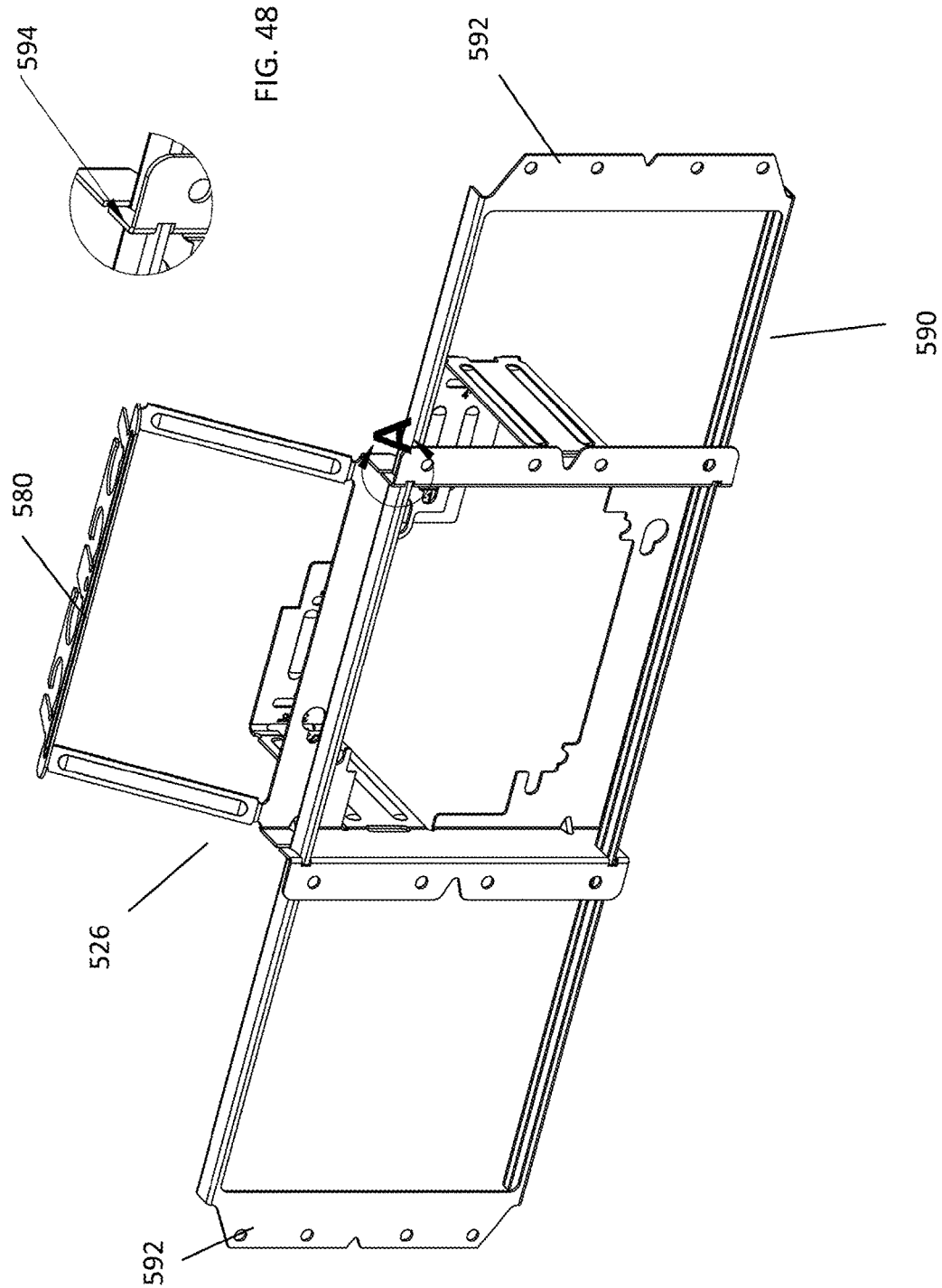

ADJUSTABLE MUD RING ASSEMBLIES

BACKGROUND OF THE DISCLOSURE

1. Field of the Disclosure

The present disclosure is related to mud rings. More particularly, the present disclosure is related to adjustable mud ring assemblies.

2. Description of Related Art

Electrical devices such as, but not limited to, electrical outlets, switches, and others are typically installed in a wall or ceiling. Here, a gang or junction box is secured to a stud or support beam inside of the wall or ceiling. The electrical device is then secured in the box in electrical communication with one or more electrical conductors so that the electrical device extends or protrudes from the wall or ceiling. In this manner, any exposed portion of the electrical conductor and its connection to the electrical device can be shielded within the box.

Various building, electric and/or fire codes have been enacted when the box, conductor, device combination is installed in walls or ceilings to ensure safety and functionality. For example, the National Electrical Code (NEC) requires that boxes employing a flush-type cover or faceplate must be installed so that a front edge of the box, or plaster ring, extension ring, or extender used therewith, is either flush with or not set back from the finished surface more than a predefined distance.

The plaster rings, extension rings, and extenders mentioned above, commonly known as mud rings, when used, are attached to the box prior to the installation of sheet rock, wall board, or other covering surface material. To avoid the need to select a mud ring of the correct depth, adjustable mud rings have also been developed. These adjustable mud rings allow the front edge to be extended or retracted to meet the necessary codes, to provide a guide during the wall covering trimming process, to prevent the box from being filled with drywall spackling paste (also known as mud), and other advantages.

Unfortunately, the prior art adjustable mud rings have proven costly to manufacture and/or difficult to use and/or assemble. Accordingly, it has been determined by the present disclosure that there is a need for adjustable mud ring assemblies that overcome, alleviate, and/or mitigate one or more of the aforementioned and other deleterious effects of prior art devices.

SUMMARY

An adjustable mud ring assembly is provided that includes a base plate, a movable ring, and an indexing screw configured to move the movable ring with respect to the base plate between a first position and a second position. The base plate has a junction box connecting portion, a support connecting portion, and a stationary ring.

In some embodiments alone or in combination with the afore or aft mentioned embodiments, the base plate has an offset distance ($D_2$) between the junction box connecting portion and the support connecting portion.

In some embodiments alone or in combination with the afore or aft mentioned embodiments, the offset distance is sufficient to allow the movable ring to move with respect to the stationary ring to the first position without protruding, at a lowermost point, into a junction box connected to the junction box connecting portion.

In some embodiments alone or in combination with the afore or aft mentioned embodiments, the junction box connecting portion can include a plurality of screw openings for connected to a junction box.

In some embodiments alone or in combination with the afore or aft mentioned embodiments, the stationary ring is a single gang and is positioned centrally in the support connecting portion so that that an electrical device, when installed in the movable ring, is offset by a predefined distance ($D_1$) from a support to which the support connection portion is connected.

In some embodiments alone or in combination with the afore or aft mentioned embodiments, the support connecting portion can include a plurality of screw openings for connecting to a support.

In some embodiments alone or in combination with the afore or aft mentioned embodiments, the base plate is a three piece metal stamping having a first part with the support and junction box connecting portions and two walls of the stationary ring and a second part with two remaining walls of the stationary ring. Here, the first and second parts can be welded together.

In some embodiments alone or in combination with the afore or aft mentioned embodiments, the support and junction box connecting portions and the stationary ring are formed of a one piece stamping.

In some embodiments alone or in combination with the afore or aft mentioned embodiments, the stationary ring include an indexing tab having a threaded opening that threadably receives the indexing screw. The indexing tab can be configured so that the indexing screw moves the movable ring between the first and second positions.

In some embodiments alone or in combination with the afore or aft mentioned embodiments, the stationary ring further comprises a biasing tab that is normally biased into contact with the movable ring so that the stationary ring remains in electrical contact with the movable ring.

In some embodiments alone or in combination with the afore or aft mentioned embodiments, the movable ring includes a draft angle at least on a side that contacts the biasing tab, the draft angle being sufficient so that, when the movable ring moves with respect to the stationary ring, the movable ring urges the biasing tab outward to simplifying assembly.

In some embodiments alone or in combination with the afore or aft mentioned embodiments, the stationary ring includes a first protrusion and the movable ring includes a second protrusion. The first and second protrusions form a space sufficient to receive a screw that secures an electrical device to the movable ring.

In some embodiments alone or in combination with the afore or aft mentioned embodiments, the movable ring includes an indexing screw opening and an indexing screw retention member. The indexing screw being received in the indexing screw opening in a rotatable manner with a shoulder of the indexing screw being retained by the indexing screw retention member.

In some embodiments alone or in combination with the afore or aft mentioned embodiments, the indexing screw retention member having a pair of members stamped from the movable ring proximate the index screw opening.

In some embodiments alone or in combination with the afore or aft mentioned embodiments, the indexing screw retention member including a clip having a pair of retention tabs and a tightening opening. The movable ring has a pair of slots adjacent to the indexing screw opening. The retention tabs being in the pair of slots and securing the clip to the movable ring with the shoulder held therebetween and the tightening opening allowing access to a head of the indexing screw.

In some embodiments alone or in combination with the afore or aft mentioned embodiments, the indexing screw has a terminal end that mitigates inadvertent withdrawal of the indexing screw from the opening.

The above-described and other features and advantages of the present disclosure will be appreciated and understood by those skilled in the art from the following detailed description and drawings.

BRIEF DESCRIPTION OF THE DRAWINGS

FIG. 16 is a top perspective view of an exemplary embodiment of a support connecting portion according to the present disclosure securing a junction box to a support prior to assembly with an adjustable mud ring assembly of the present disclosure;

FIG. 30 is a top view of an alternate exemplary embodiment of an adjustable mud ring assembly according to the present disclosure;

FIG. 31 is a partial sectional view of the adjustable mud ring assembly of FIG. 30 before/during adjustment, taken along line C-C of FIG. 30;

FIG. 32 is a partial sectional view of the adjustable mud ring assembly of FIG. 30 after adjustment, taken along line C-C of FIG. 30;

FIG. 33 is a top view of the adjustable mud ring assembly of FIG. 19 including an optional extension ring according to the present disclosure;

FIG. 34 is an end view of the adjustable mud ring assembly and of extension ring FIG. 33, taken along line N-N of FIG. 33;

FIG. 35 is a partial sectional view of the adjustable mud ring assembly and extension ring of FIG. 33;

FIGS. 38-40 illustrate an exemplary embodiment of a retainer for an adjustment screw of the adjustable mud ring assembly of FIG. 37;

FIG. 43 is a rear perspective view of the support connecting portion of FIG. 41;

FIG. 44 is a front view of the support connecting portion of FIG. 41;

FIG. 45 is a side view of the support connecting portion of FIG. 41;

FIG. 46 is a top view of the support connecting portion of FIG. 41;

FIG. 47 is a top view of the support connecting portion of FIG. 41 in use with an open space bracket; and FIG. 48 is a magnified view of a portion of the support connecting portion of FIG. 47, taken at circle A of FIG. 47.

DETAILED DESCRIPTION

Figure 1:
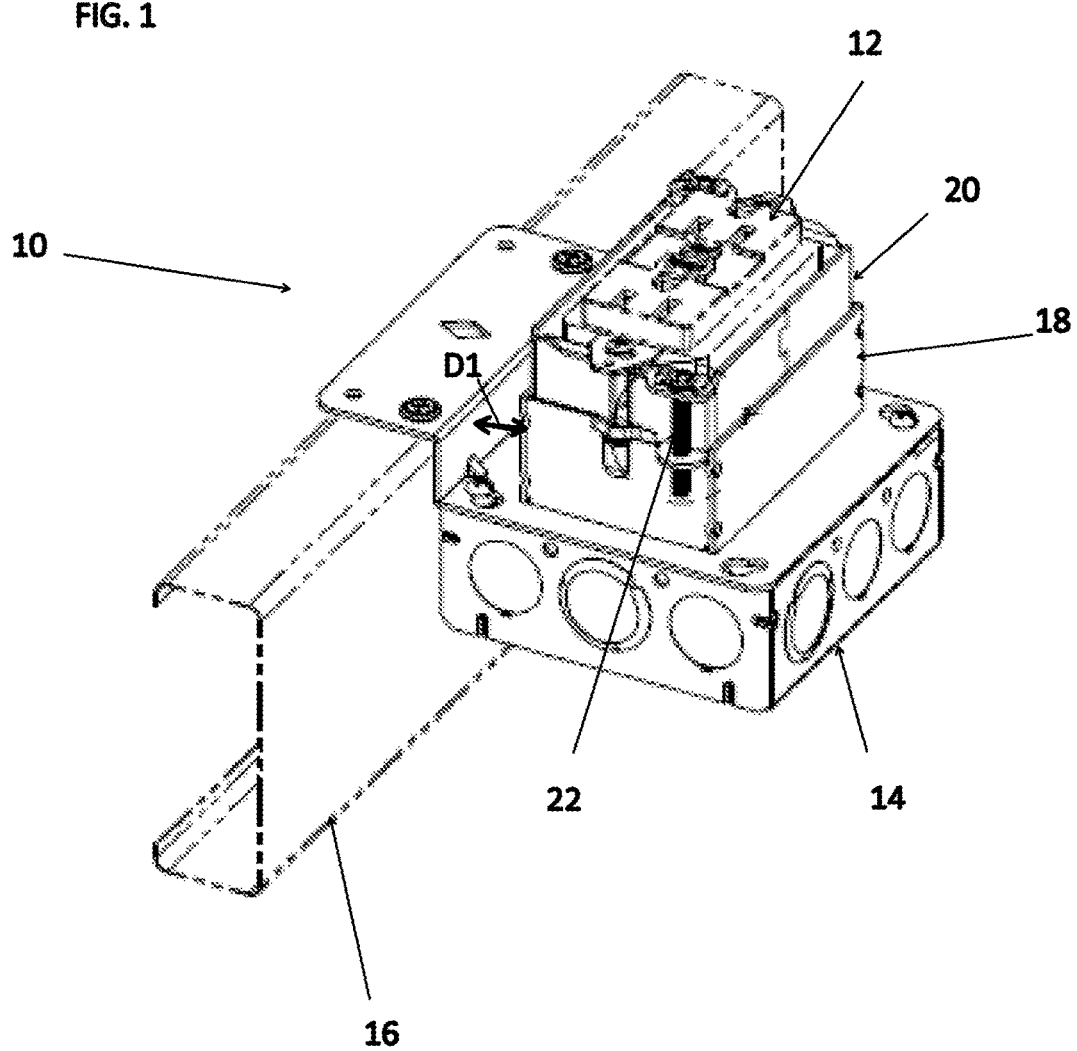
FIG. 1 is a top perspective view of an adjustable mud ring assembly an adjustable mud ring assembly according to the present disclosure is use.
Figure 2:
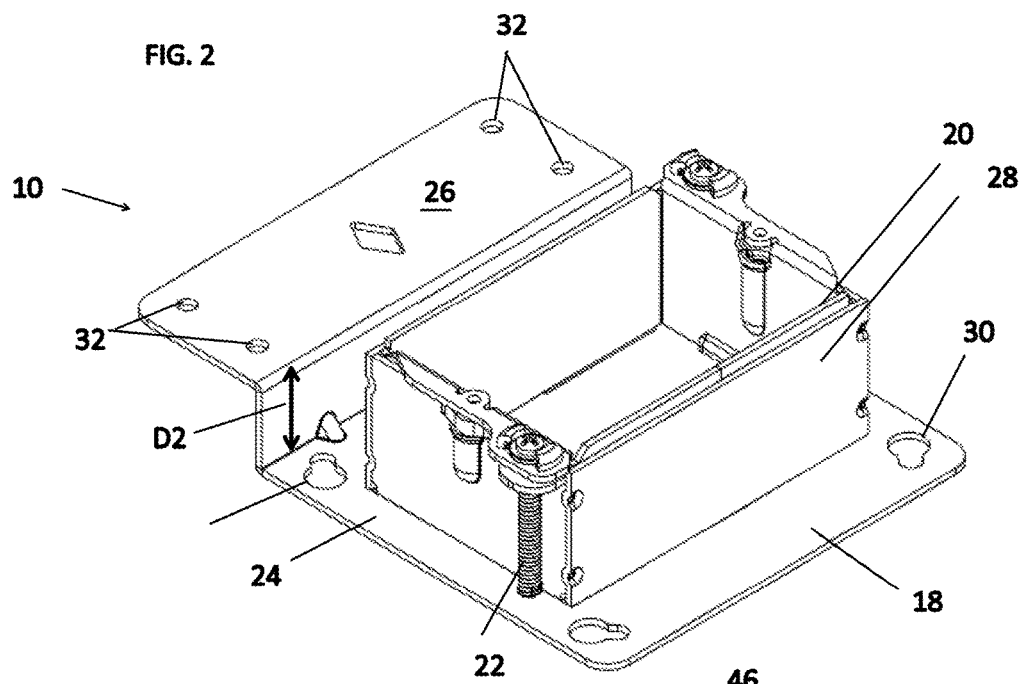
FIG. 2 is a top perspective view of the adjustable mud ring assembly of FIG. 1 before use in a first or retracted position.
Figure 3:
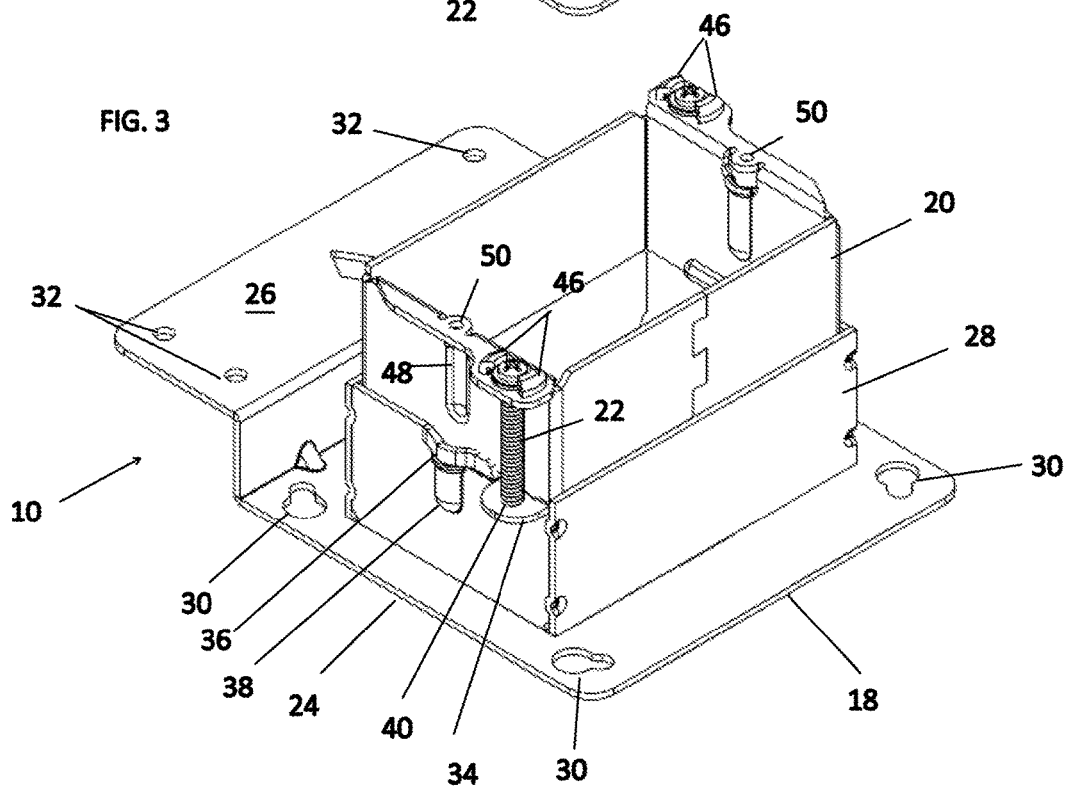
FIG. 3 is a top perspective view of the adjustable mud ring assembly of FIG. 1 in a second or extended position.

Referring to the drawings and in particular to FIGS. 1-3, an exemplary embodiment of an adjustable mud ring assembly according to the present disclosure is shown and is generally referred to by reference numeral 10. Here, mud ring assembly 10 is shown in use securing an electrical device 12 such as, but not limited to an electric outlet, to a junction box 14 and a support 16.

Advantageously, assembly 10 includes a base plate 18, a movable ring 20, and an indexing screw 22, which can be used to move the movable ring with respect to the base plate between a first or retracted position (FIG. 2) and a second or extended position (FIG. 3) in an easy and repeatable manner.

Assembly 10 is now described in more detail with simultaneous reference to FIGS. 1-6.

Base 18 includes a junction box connecting portion 24, a support connecting portion 26, and a stationary ring 28. Support connecting portion 26 is also referred to herein as a mounting bracket or bracket. In the illustrated embodiment, movable ring 20 is shown as being internal to stationary ring 28 by way of example only. Of course, it is contemplated by the present disclosure for assembly 10 to be configured so that stationary ring 28 is internal to movable ring 20 examples of which are illustrated in embodiments of FIGS. 16 through 41 herein below.

Junction box connecting portion 24 includes a plurality of screw openings 30, which allow assembly 10 to be connected to junction box 14 in a known manner. In the embodiment illustrated in FIG. 1, junction box 14 is shown as a double-gang. Thus, connecting portion 24 is shown configured for connection to such a double-gang box. Of course, it is contemplated by the present disclosure for connecting portion 24 to be configured for connection to box 14 of any desired size (single, double, etc.).

Further, connecting portion 24 is shown in use with stationary ring 28 that is sized as a single gang namely for receipt of a single electrical device 12. Of course and as will be described in more detail herein, it is contemplated by the present disclosure for stationary ring 28 to be configured for use with any desired number of electrical devices 12 single, double, or more.

Stationary ring 28 is, in the illustrated embodiment, positioned centrally in connecting portion 24. In this manner, assembly 10 is configured so that electrical device 12, when installed, is offset by a predefined distance ($D_1$) from support 16. Of course, it is contemplated by the present disclosure for stationary ring 28 to have any desired position on connecting portion 24.

Support connecting portion 26 is illustrated by way of example have a trace mount configuration, namely to trace around two sides of support 16. Portion 26 includes a plurality of screw openings 32, which allow the portion to be connected to support 16 in a known manner. Additionally, the trace mount configuration provides base 18 with an offset distance ($D_2$) between junction box connecting portion 24 and support connecting portion 26. For reasons that will described in more detail below, offset distance ($D_2$) is believed by the present disclosure to allow movable ring 20 to with respect to stationary ring 28 to the first or retracted position without protruding, at this lowermost point, into box 14.

In its most basic form within the scope of the present disclosure, offset distance ($D_2$) is a distance between an outer face of support 16 (or an rear face of the wall board secured to the support) and a top face of box 14. Thus, offset distance ($D_2$) is effective to offset the box 14 from the rear face of the wall board.

It has been found by the present disclosure that incorporating support connecting portion 26 integrally into assembly 10 namely integrally forming junction box connecting portion 24 and support connecting portion 26—ensures proper and repeatable placement of the assembly on support 16.

Stated another way, it is believed by the present application that the trace mount configuration of base 18, which includes portions 24, 26 integral with one another resolves, in a simple manner, multiple issues in prior art devices such as, but not limited to, preventing movement of movable ring 20 into box 14, ensuring placement of assembly 10 at position on support 16 that does not extend past the maximum throw of movable ring 20 at the second or extended position, and others.

However and is disclosed in various embodiments herein below, it is further contemplated by the present disclosure for support connecting portion 26 to be secured to or integral with junction box 14, with base 18 connected thereto.

Figure 4:
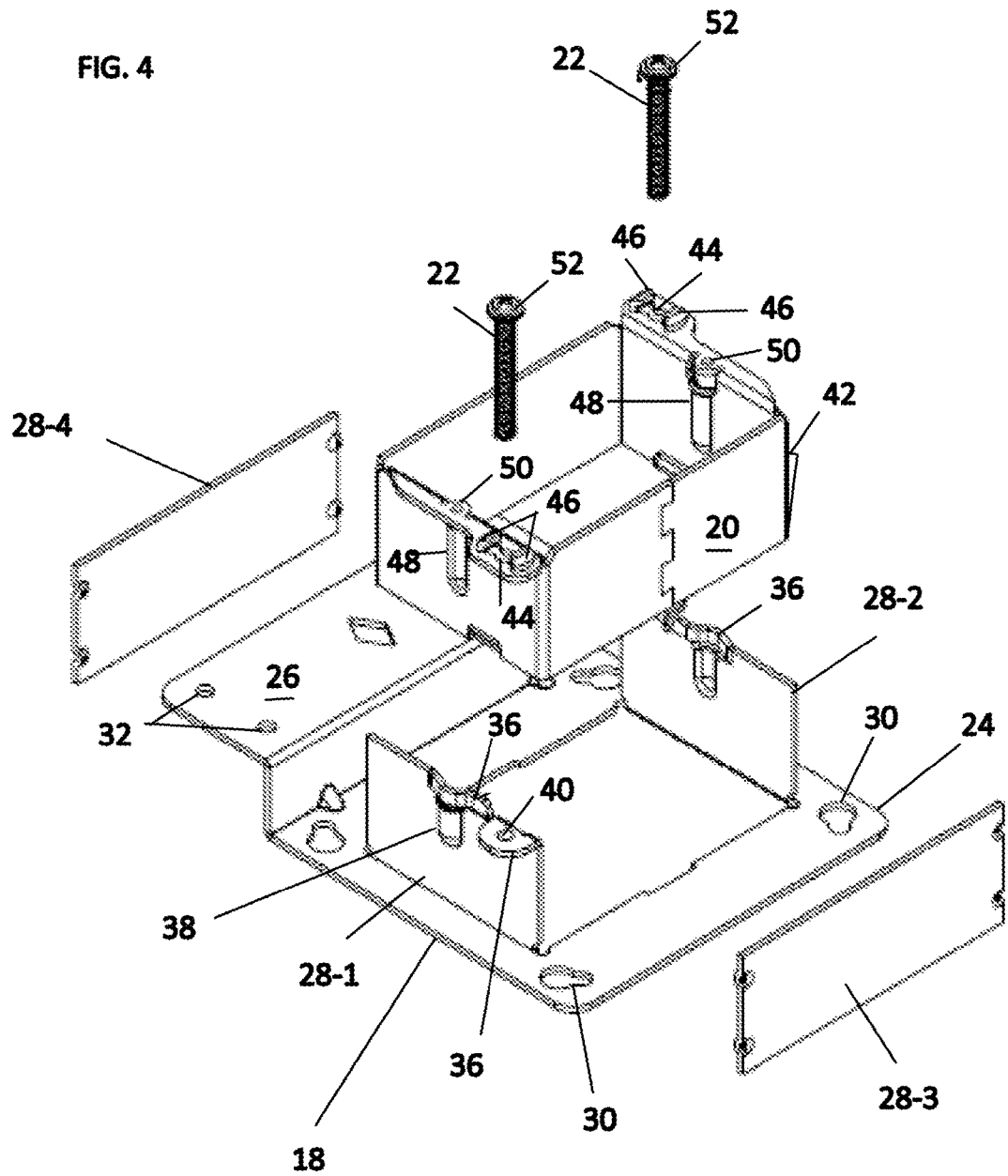
FIG. 4 is an exploded or disassembled view of the adjustable mud ring assembly of FIG. 1.

As best seen in FIG. 4, base 18 is, in this embodiment, formed as a three piece metal stamping that includes a first part having connecting portions 24, 26, and two walls 28-1, 28-2 of stationary ring 28, and two additional parts that form the remaining two walls 28-3, 28-4 of the stationary ring. During manufacture, the three parts of base 18 are joined together by any desired process. For example, walls 28-3, 28-4 can be joined to walls 28-1, 28-2 and/or base 18 by one or more welds or another connection device or method.

Of course, it is contemplated by the present disclosure for base 18 to be formed in any desired manner such as, but not limited to, casting, metal injection molding, additive manufacturing, and others.

Stationary ring 28 further includes an indexing tab 34, a biasing tab 36, and a first protrusion 38. In the illustrated embodiment, stationary ring 28 includes tabs 34, 36 and protrusion 38 on opposing sides thereof. However for ease of description, only one side will be discussed herein.

Indexing tab 34 has a threaded opening 40 to receive indexing screw 22, which as described in more detail below allows the indexing screw to move movable ring 20 between the first and second positions.

Biasing tab 36 and protrusion 38 are configured to allow screws (FIG. 1) that secure electric device 12 to movable ring 20 to pass therethrough. In some embodiments, biasing tab 36 can be biased into contact with the screws that secure electric device 12 to movable ring 20 to guide the screws during assembly and disassembly.

Additionally, biasing tab 36 is advantageously configured to be normally biased into contact with movable ring 20. In this manner, biasing tab 36 ensures that stationary ring 28 remains in desired electrical contact with movable ring 20. In some embodiments, movable ring 20 can include a draft angle 42 (FIG. 4) at least on the sides that contact biasing tabs 36. In this manner, draft angle 42 of movable ring 20, when the movable ring positioned with respect to stationary ring 28, allows the movable ring to urge biasing tab 36 outward, simplifying assembly.

Movable ring 20 includes an indexing screw opening 44, an indexing screw retention member 46, a second protrusion 48, and a threaded opening 50. Similar to the discussion above with respect to stationary ring 28, movable ring 20, in the illustrated embodiment, includes opening 44, retention member 46, recess 48, and threaded opening 50 on opposing sides thereof. However for ease of description, only one side will be discussed herein.

Figure 5:
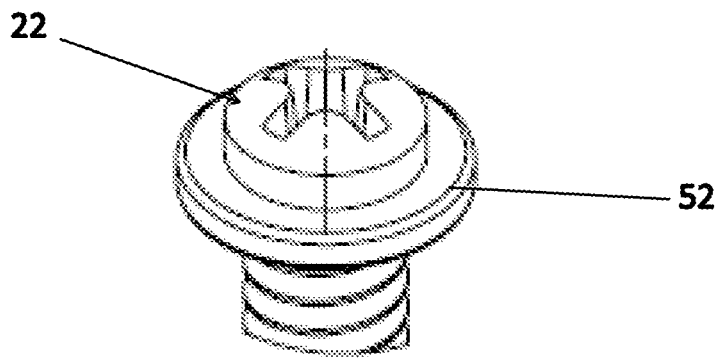
FIG. 5 is an enlarged top perspective view of an indexing screw of the adjustable mud ring assembly of FIG. 1.
Figure 6:
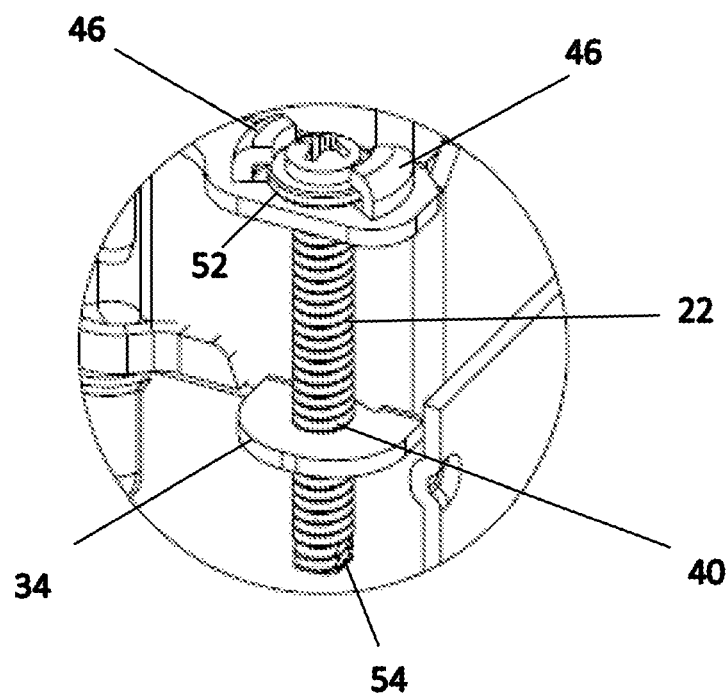
FIG. 6 is an enlarged view of the adjustable mud ring assembly of FIG. 1 illustrating the indexing screw in use.
Figure 7:
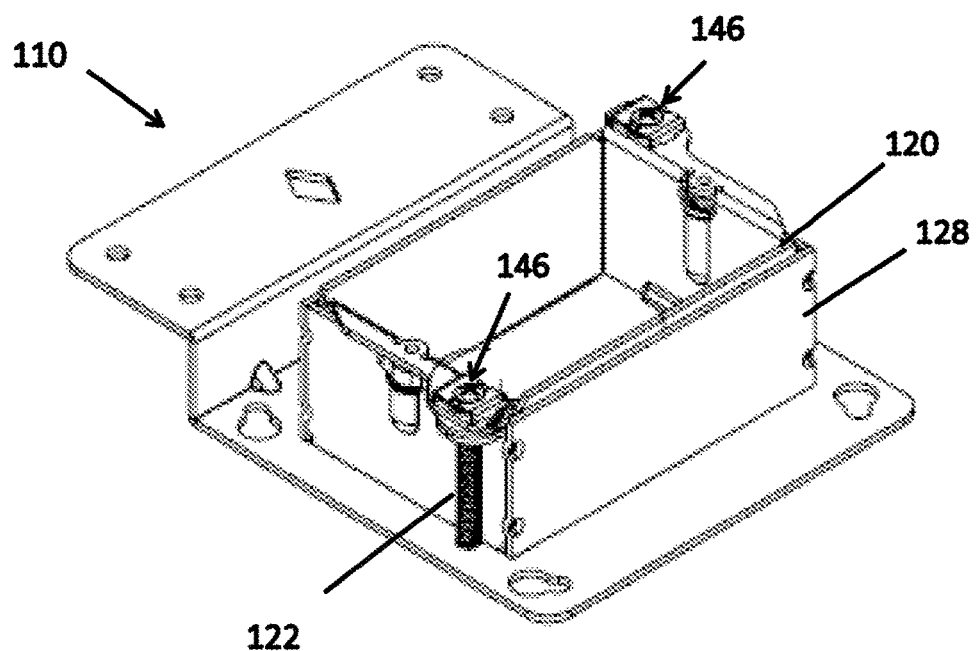
FIG. 7 is a top perspective view of an adjustable mud ring assembly according to the present disclosure in the first or retracted position having an alternate exemplary embodiment of an indexing screw retention member.
Figure 8:
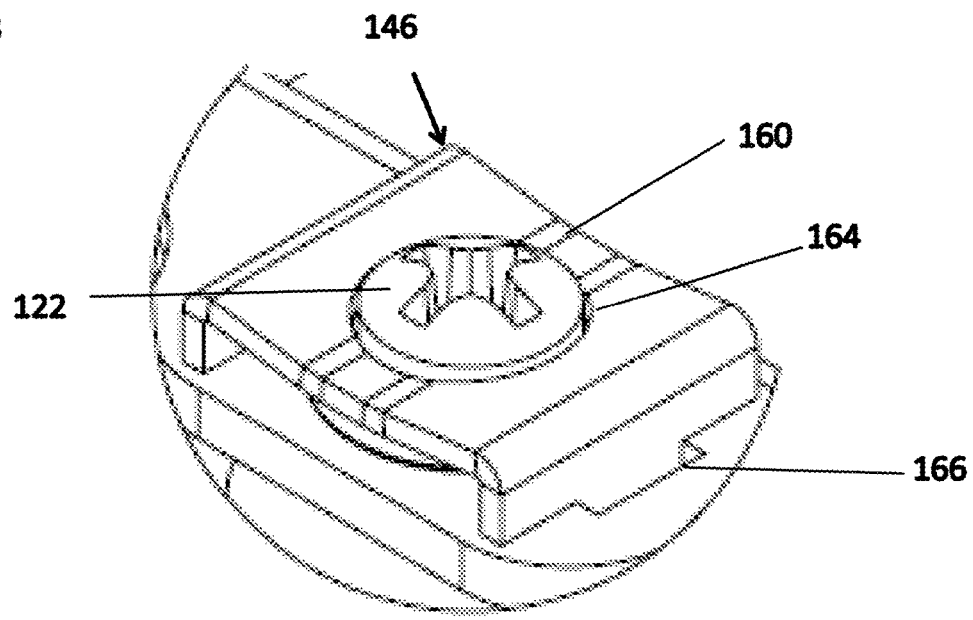
FIG. 8 is an enlarged view of the adjustable mud ring assembly of FIG. 7 illustrating the indexing screw in use.
Figure 9:
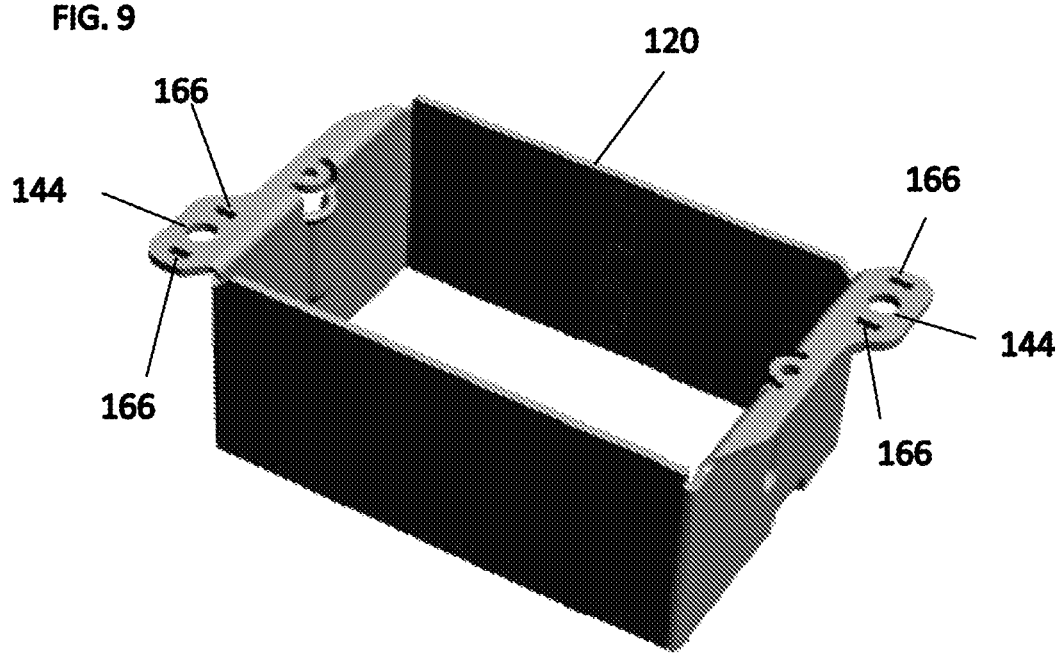
FIG. 9 is a top perspective view of a movable ring of the adjustable mud ring assembly of FIG. 7.
Figure 10:
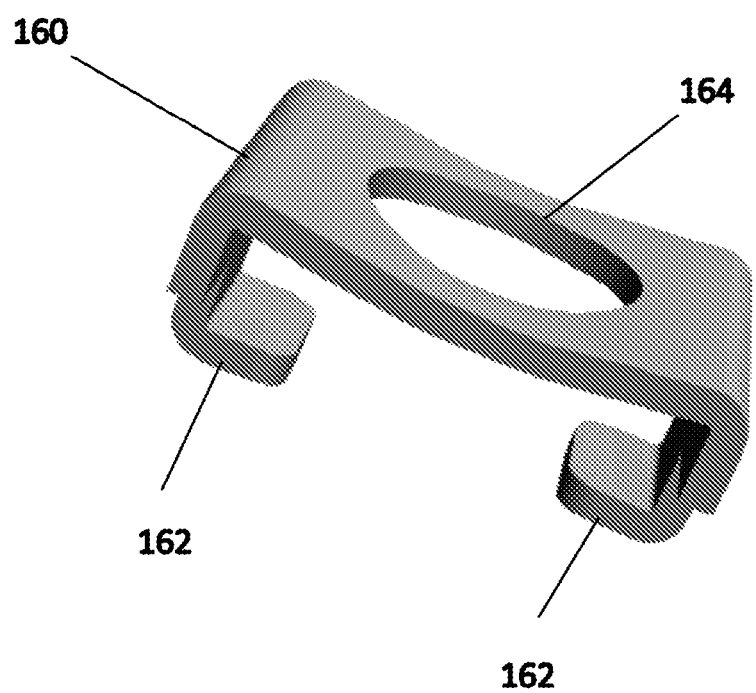
FIG. 10 is a top perspective view of the retention member of FIG. 7.

As shown in FIGS. 5 and 6, indexing screw 22 is received in opening 44 in a rotatable manner with shoulder 52 of the screw retained by retention member 46. The indexing screw 22 is threadably received in threaded opening 40 of indexing tab 34. In this manner, rotation of indexing screw 22 in a first direction causes shoulder 52 to act on movable ring 20 to move the movable ring with respect to stationary ring 28 towards the first or retracted position. Conversely, rotation of indexing screw 22 in a second, opposite direction causes shoulder 52 to act on movable ring 20 to move the movable ring with respect to stationary ring 28 towards the second or extended position.

In the illustrated embodiment, retention member 46 includes a pair of members stamped from movable ring 20 around opening 44. During assembly, retention members 46 can be deformed over shoulder 52 after insertion of screw 22 into opening 44. Of course, it is contemplated by the present disclosure for opening 44 to be formed as a slot so that screw 22 can be inserted laterally with shoulder 52 passing under retention member 46.

In some embodiments, screw 22 can have a terminal end 54 that mitigates inadvertent withdrawal of the screw from opening 50 at the fully extended or upper most position of movable ring 20.

Threaded opening 50 threadably receives the screw that secure electric device 12 to movable ring 20 with the screws passing between movable and stationary rings 20, 28 in the space formed between first and second protrusions 38, 48. It has been determined by the present disclosure that passing these screws between movable and stationary rings 20, 28 prevents the screws from passing into a space occupied by any exposed, live electrical contacts (i.e., within movable ring 20 and/or junction box 14). Further, it has been determined by the present disclosure that passing these screws between movable and stationary rings 20, 28 prevents the screws from binding or contacting on wall surface material or mud that may abut assembly 10 during assembly of electrical device 12 to the movable ring.

Accordingly, assembly 10 is advantageously configured to allow the user to easily and repeatably locate junction box 14 on support 16 at a position that is within the allowable movement of movable ring 20 between its first and second positions, while preventing the movable ring 20 from protruding into the space of the junction box at the fully retracted position and ensuring that any screws that secure electrical device 12 in the movable ring extend into the space between the movable and stationary ring.

Referring now to FIGS. 7-10, an alternate exemplary embodiment of an adjustable mud ring assembly according to the present disclosure in the first or retracted position is shown and is generally referred to by reference numeral 110. Component parts having similar or analogous features are labeled in multiples of 100 to those in FIGS. 1-6.

Assembly 110 has an alternate exemplary embodiment of an indexing screw retention member 146 that secures indexing screw 122, via shoulder 152, to movable ring 120, allowing the rotation of the screw to move the movable ring, with respect to stationary ring 128 in the manner described above.

In this embodiment, retention member 146 includes a clip 160 having a pair of retention tabs 162 and a tightening opening 164. Retention member 146 also includes a pair of slots 166 defined in movable ring 120 adjacent indexing screw opening 144. Retention tabs 162 are received in slots 166 to secure clip 160 to movable ring 120, with shoulder 152 held therebetween. Tightening opening 164 allows access to the head of screw 122 to allow the screw to be tightened and loosened as needed.

Accordingly, assembly 110, like assembly 10, is advantageously configured to allow the user to easily and repeatably locate the junction box on the support at a position that is within the allowable movement of movable ring 120 between its first and second positions, while preventing the movable ring 120 from protruding into the space of the junction box at the fully retracted position and ensuring that any screws that secure the electrical device in the movable ring extend into the space between the movable and stationary ring.

Figure 11:
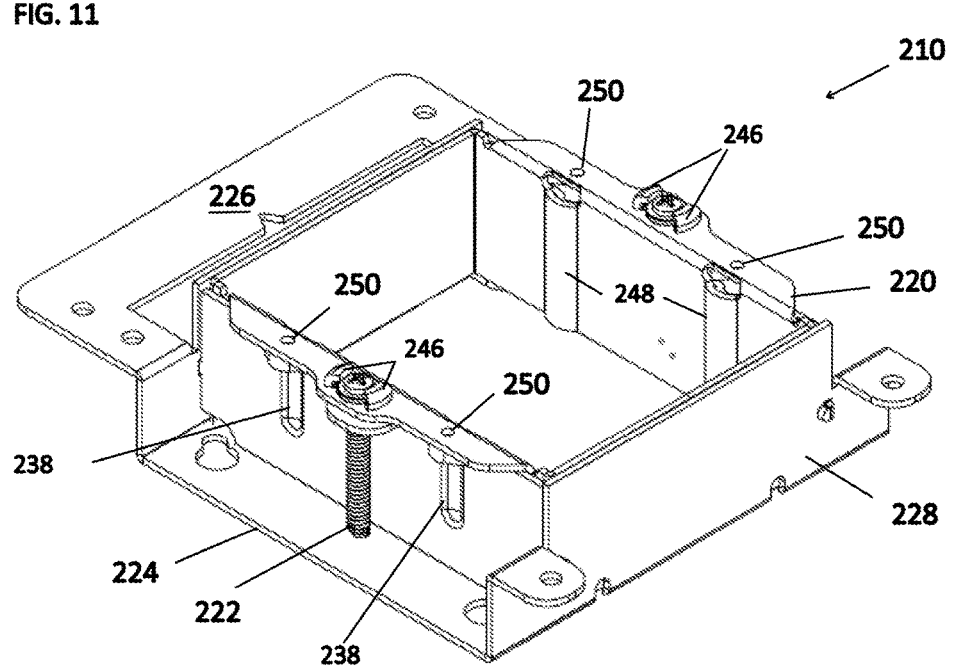
FIG. 11 is a top perspective view of another exemplary embodiment of an adjustable mud ring assembly according to the present disclosure in the first or retracted position.
Figure 12:
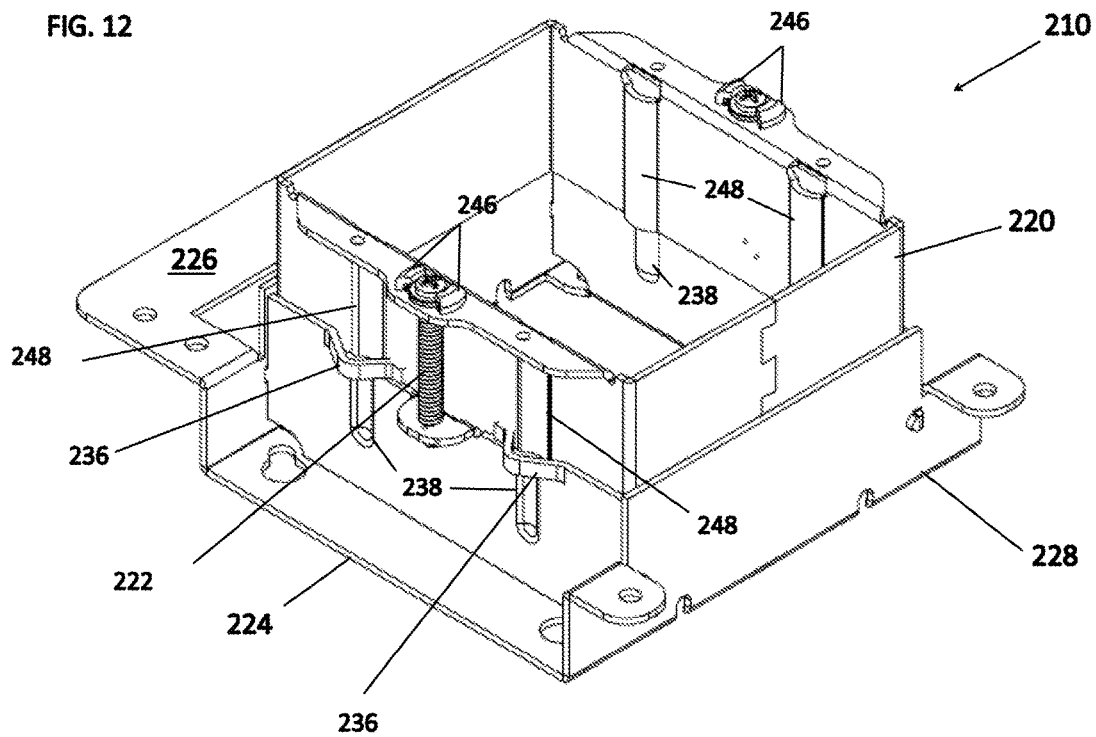
FIG. 12 is a top perspective view of the adjustable mud ring assembly of FIG. 11 in the second or extended position.
Figure 13:
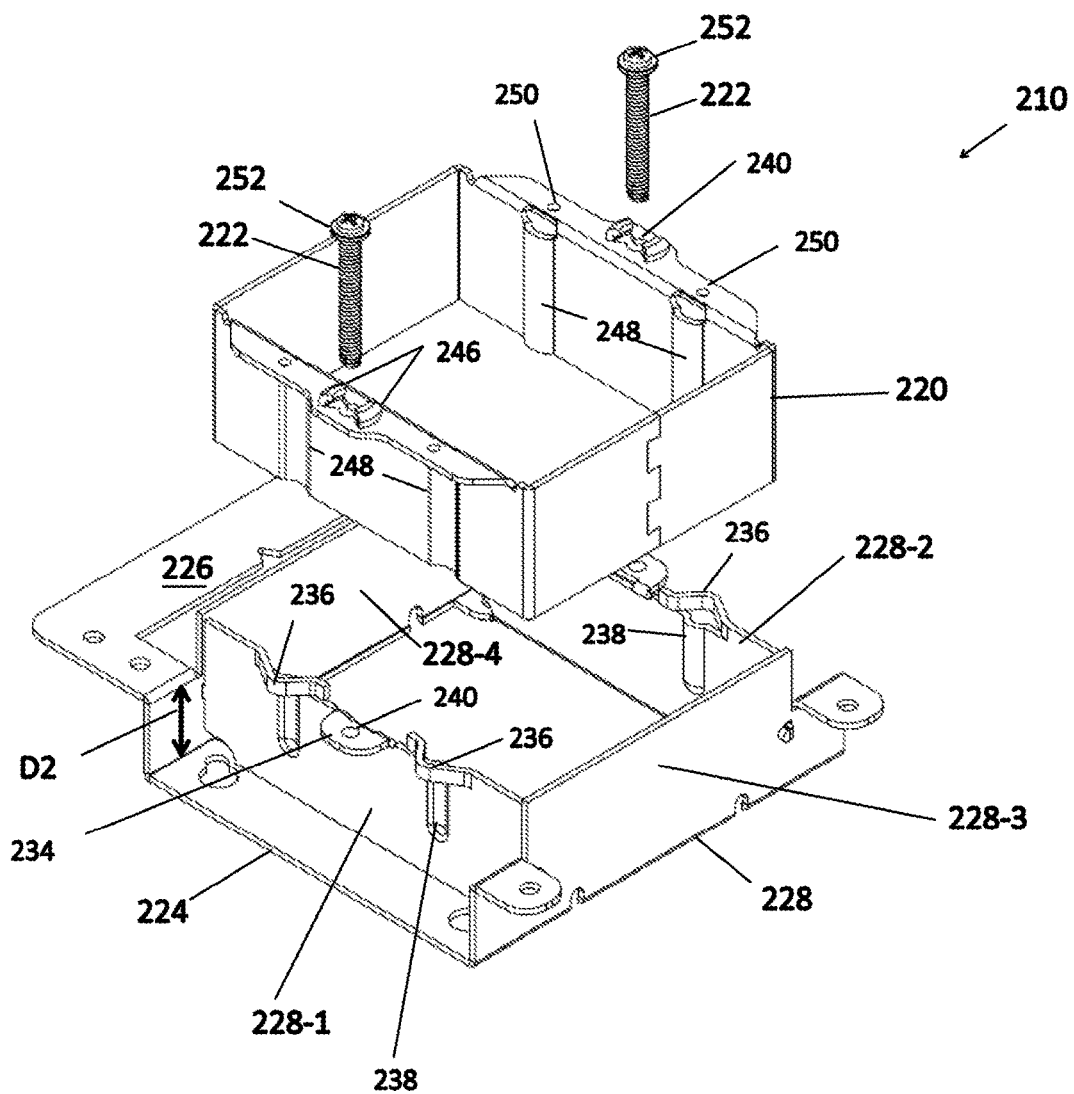
FIG. 13 is an exploded or disassembled view of the adjustable mud ring assembly of FIG. 11.

Referring now to FIGS. 11-13, another alternate exemplary embodiment of an adjustable mud ring assembly according to the present disclosure is shown and is generally referred to by reference numeral 210. Component parts having similar or analogous features are labeled in multiples of 200 to those in FIGS. 1-6.

Assembly 210 is shown in FIG. 11 in the first or retracted position, in FIG. 12, in the second or extended position, and in FIG. 13 in an exploded or disassembled stated. Here, assembly 210 is shown configured for use with a double gang or junction box (not shown) and for use with two electrical devices (also not shown).

Assembly 210 includes base plate 218, movable ring 220, and indexing screw 222, which can be used to move the movable ring with respect to the base plate between the retracted position and extended position in an easy and repeatable manner.

Base 218 includes junction box connecting portion 224, support connecting portion 226, and stationary ring 228. As a result of the configuration of this embodiment of assembly 210 namely where both junction box connecting portion 224 and stationary ring 228 are configured for use in a double gang construction, the offset distance ($D_1$) of assembly 10 (FIG. 1) is not required. Of course, it is contemplated by the present disclosure for stationary ring 228 to have any desired position on connecting portion 224.

Support connecting portion 226 provides base 218 with offset distance ($D_2$) between junction box connecting portion 224 and support connecting portion 226. For the reasons discussed above, offset distance ($D_2$) is believed by the present disclosure to allow movable ring 220 to move into stationary ring 228 to the first or retracted position without protruding, at this lowermost point, into the junction box.

Figure 14:
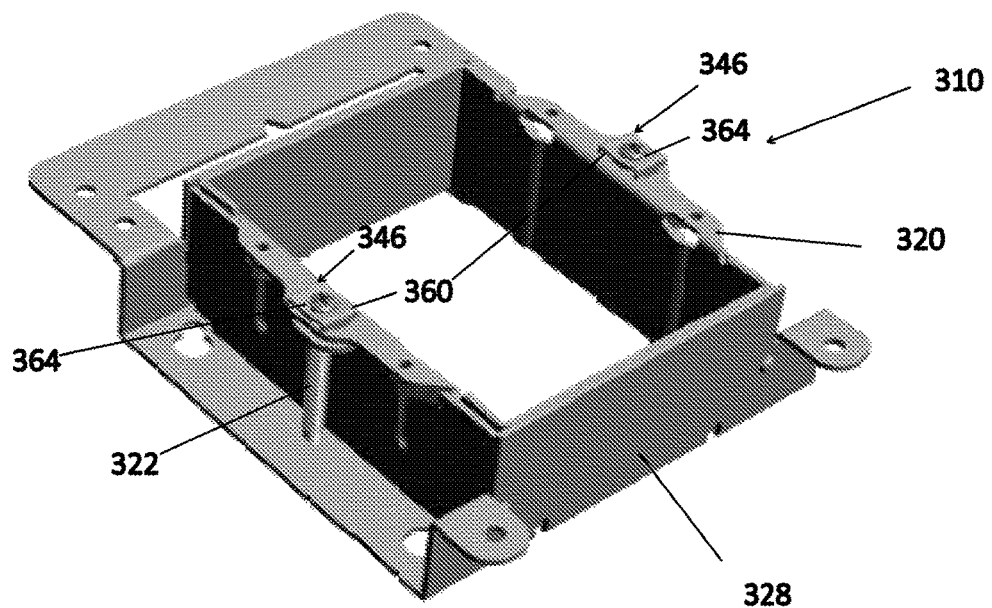
FIG. 14 is a top perspective view of an adjustable mud ring assembly according to the present disclosure in the first or retracted position having an the alternate exemplary embodiment of the indexing screw retention member.

As best seen in FIG. 14, base 218 is, in this embodiment, formed as a single piece metal stamping that includes connecting portions 224, 226, and all four walls 228-1, 228-2, 228-3, 228-4 of stationary ring 228. Of course, it is contemplated by the present disclosure for base 218 to be formed in any desired manner such as, but not limited to, casting, metal injection molding, additive manufacturing, and others.

Stationary ring 228 includes indexing tab 234 and since it is configured for use with two electrical devices—two biasing tabs 236 and two first protrusions 238. In the illustrated embodiment, stationary ring 228 includes tabs 234, 236 and protrusions 238 on opposing sides thereof. However for ease of description, only one side will be discussed herein.

Indexing tab 234 has threaded opening 240 to receive indexing screw 222, which allows the indexing screw to move movable ring 220 between the first and second positions.

Biasing tabs 236 and protrusions 238 are configured to allow the screws that secure the electric devices to movable ring 220 to pass therethrough. In some embodiments, biasing tabs 236 can be biased into contact with the screws that secure the electric device to movable ring 220 to guide the screws during assembly and disassembly. Additionally, biasing tabs 236 are advantageously configured to be normally biased into contact with movable ring 220 to ensure that stationary ring 228 remains in desired electrical contact with the movable ring 20. In some embodiments, movable ring 220 can include a draft angle 242 (FIG. 13) at least on the sides that contact biasing tabs 236. In this manner, draft angle 242 of movable ring 220, when the movable ring is positioned with respect to stationary ring 228, allows the movable ring to urge biasing tabs 236 outward, simplifying assembly.

Movable ring 220 includes indexing screw opening 244, indexing screw retention member 246, second protrusion 248, and threaded opening 250. Similar to the discussion above with respect to stationary ring 228, movable ring 220, in the illustrated embodiment where assembly 210 is configured for receipt of two electrical devices, includes opening 244, retention member 246, two recesses 248, and two threaded openings 250 on opposing sides thereof. However for ease of description, only one side are discussed herein.

Indexing screw 222, as discussed above with respect to assembly 10, is received in opening 244 in a rotatable manner with shoulder 252 of the screw retained by retention member 246. The indexing screw 222 is threadably received in threaded opening 240 of indexing tab 234. In this manner, rotation of indexing screw 222 in a first direction causes shoulder 252 to act on movable ring 220 to move the movable ring with respect to stationary ring 228 towards the first or retracted position. Conversely, rotation of indexing screw 222 in a second, opposite direction causes shoulder 252 to act on movable ring 220 to move the movable ring with respect to stationary ring 228 towards the second or extended position.

Accordingly, assembly 210, like assemblies 10 and 110, is advantageously configured to allow the user to easily and repeatably locate the junction box on the support at a position that is within the allowable movement of movable ring 220 between its first and second positions, while preventing the movable ring 220 from protruding into the space of the junction box at the fully retracted position and ensuring that any screws that secure the electrical device in the movable ring extend into the space between the movable and stationary ring.

Figure 15:
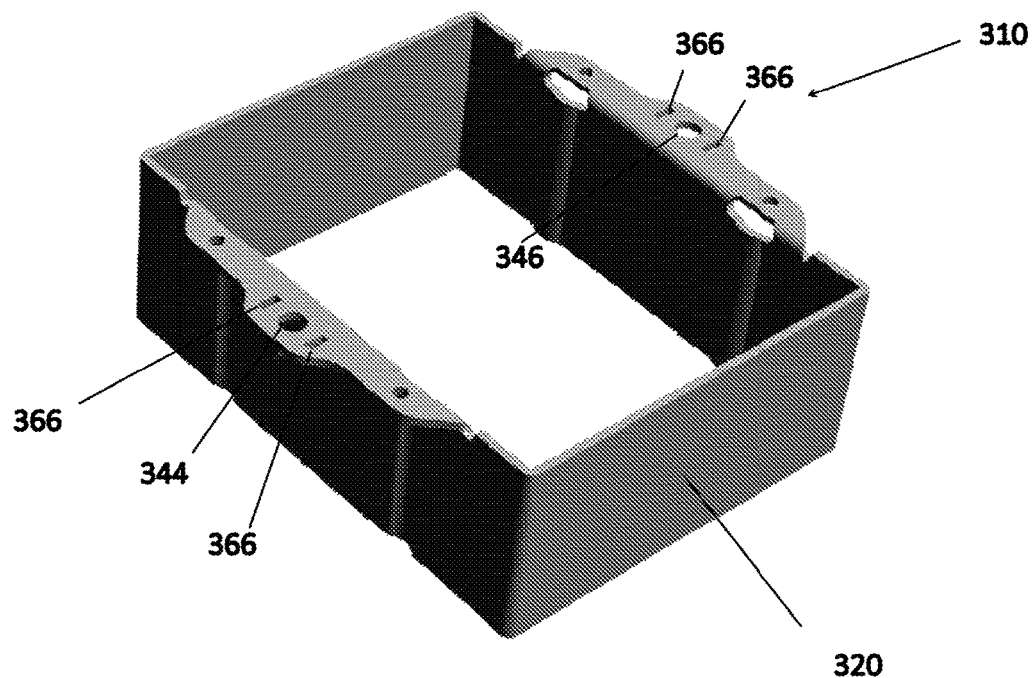
FIG. 15 is a top perspective view of a movable ring of the adjustable mud ring assembly of FIG. 14.
Figure 18:
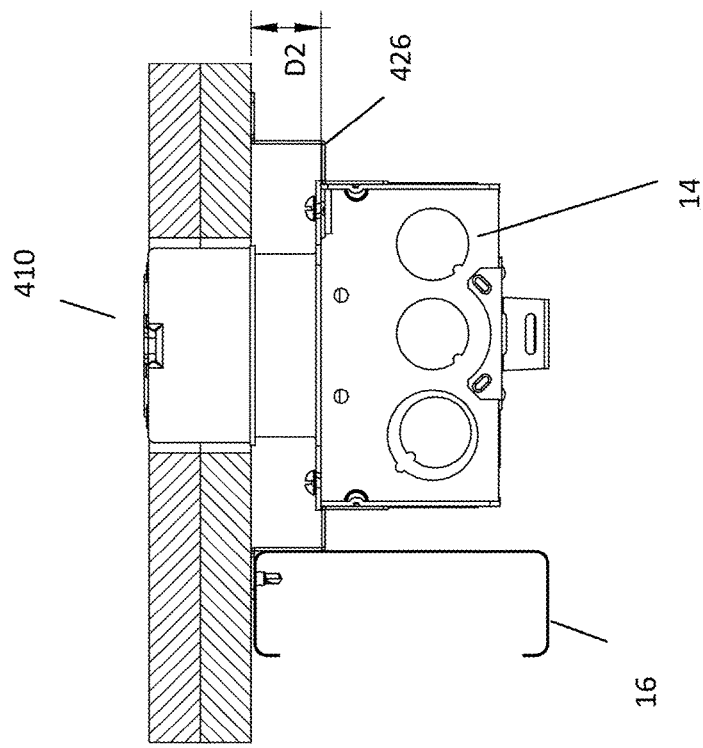
FIG. 18 is a partial sectional view of the assembly of FIG. 17.
Figure 17:
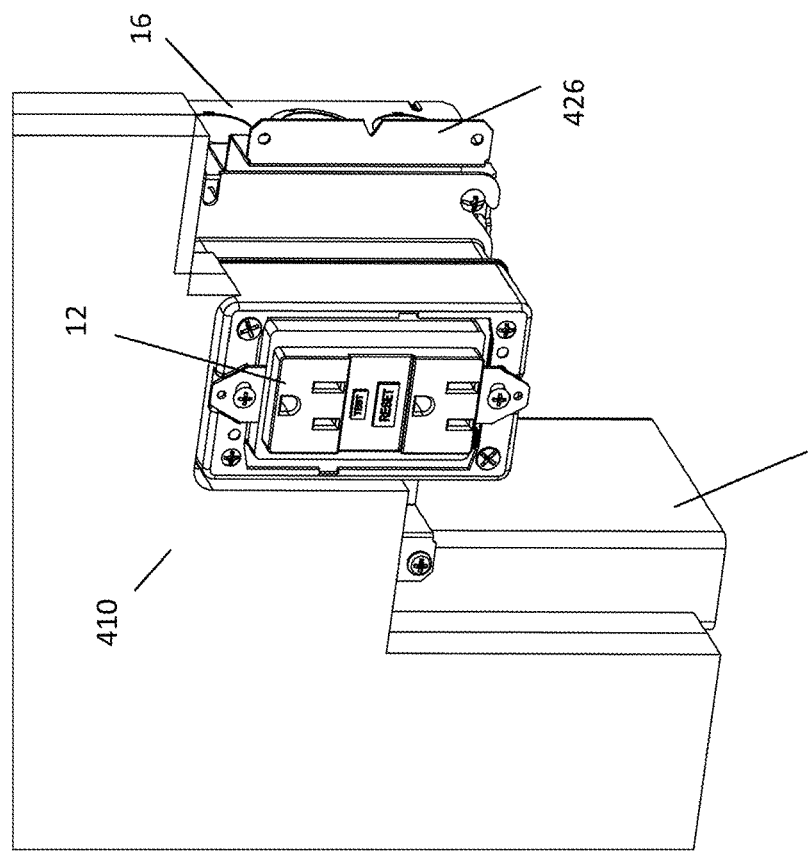
FIG. 17 illustrates the support connection portion of FIG. 16 after installation with adjustable mud ring assembly and the electrical device.
Figure 19:
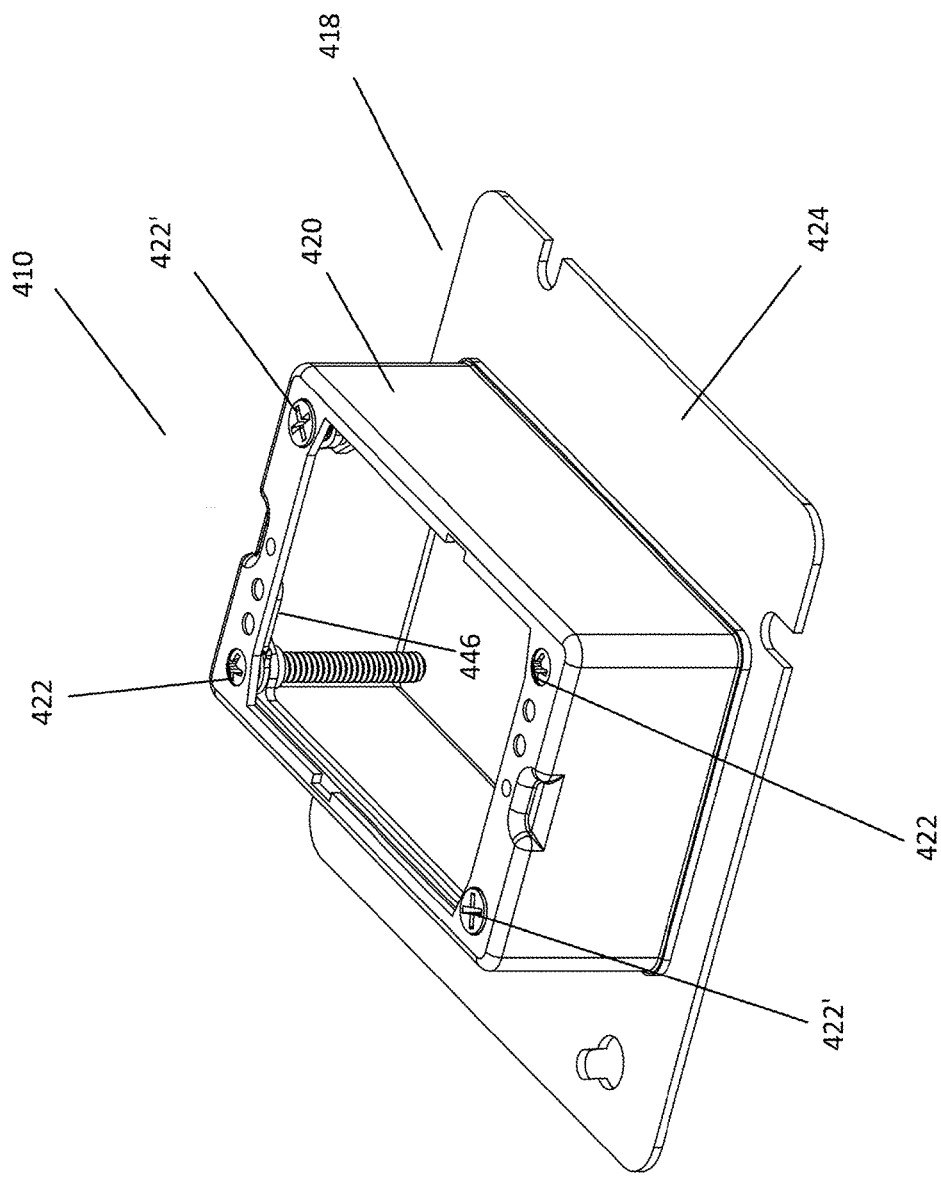
FIG. 19 is a top perspective view of the adjustable mud ring assembly of FIG. 17.
Figure 23:
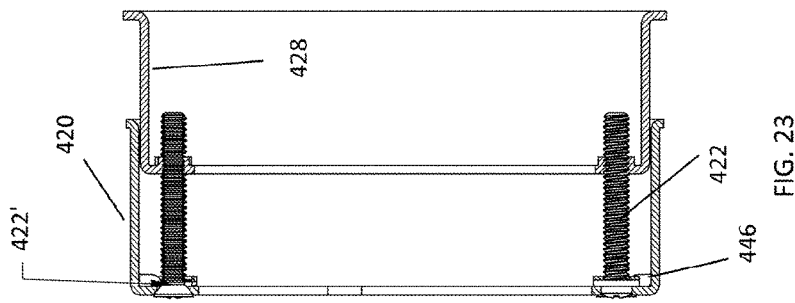
FIG. 23 is a partial sectional view of the adjustable mud ring assembly of FIG. 19 after adjustment, taken along line A-A of FIG. 20.
Figure 22:
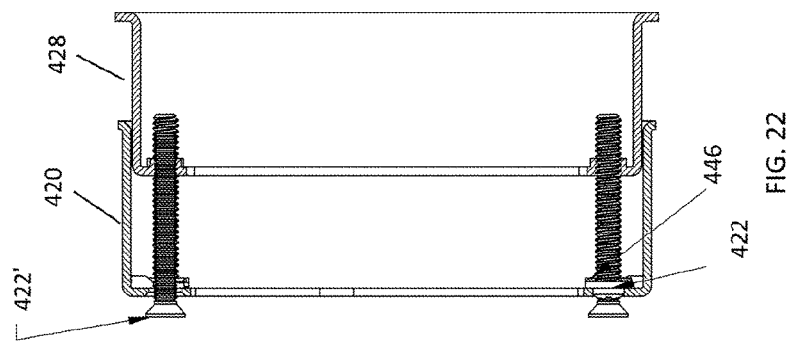
FIG. 22 is a partial sectional view of the adjustable mud ring assembly of FIG. 19 during adjustment, taken along line A-A of FIG. 20.
Figure 20:
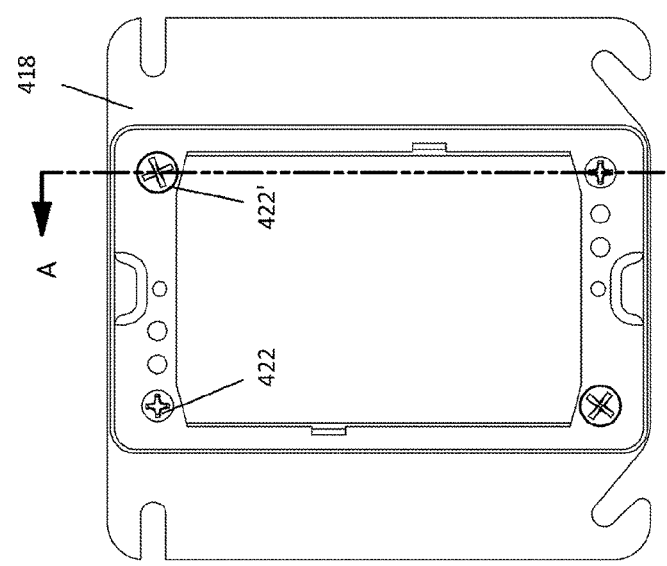
FIG. 20 is a top view of the adjustable mud ring assembly of FIG. 19.
Figure 21:
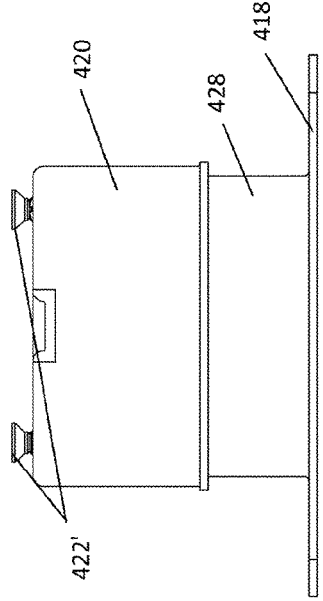
FIG. 21 is an end view of the adjustable mud ring assembly of FIG. 19.
Figure 29:
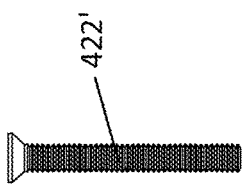
FIG. 29 illustrates an exemplary embodiment of a clamping screw of the adjustable mud ring assembly of FIG. 19.
Figures 27, 28:
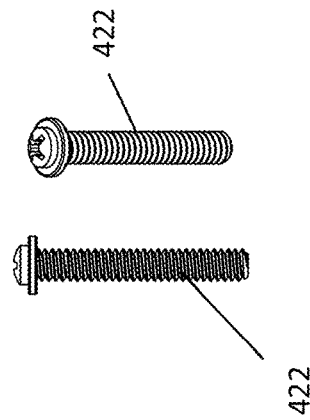
FIGS. 27-28 illustrate an exemplary embodiment of an adjustment screw of the adjustable mud ring assembly of FIG. 19.
Figure 26:
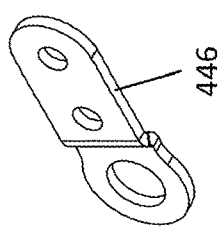
FIGS. 24-26 illustrate an exemplary embodiment of a retainer for an adjustment screw of the adjustable mud ring assembly of FIG. 19.
Figures 24, 25:
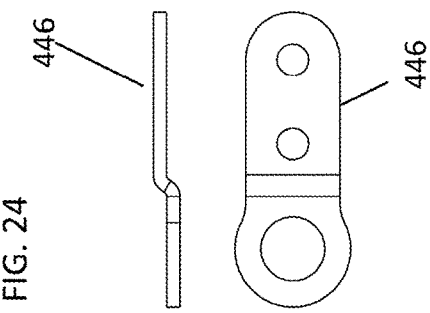
Figure 36:
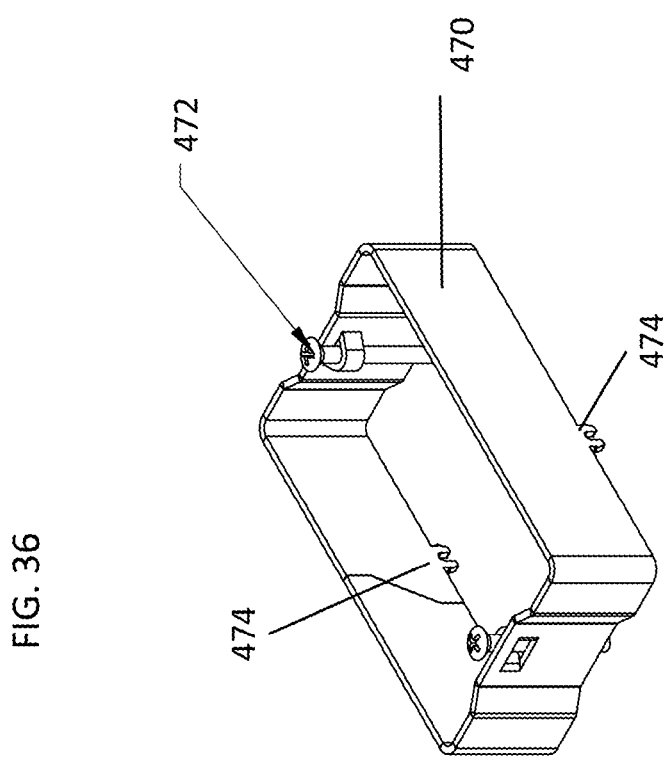
FIG. 36 is a top perspective view of the extension ring of FIG. 33.
Figure 37:
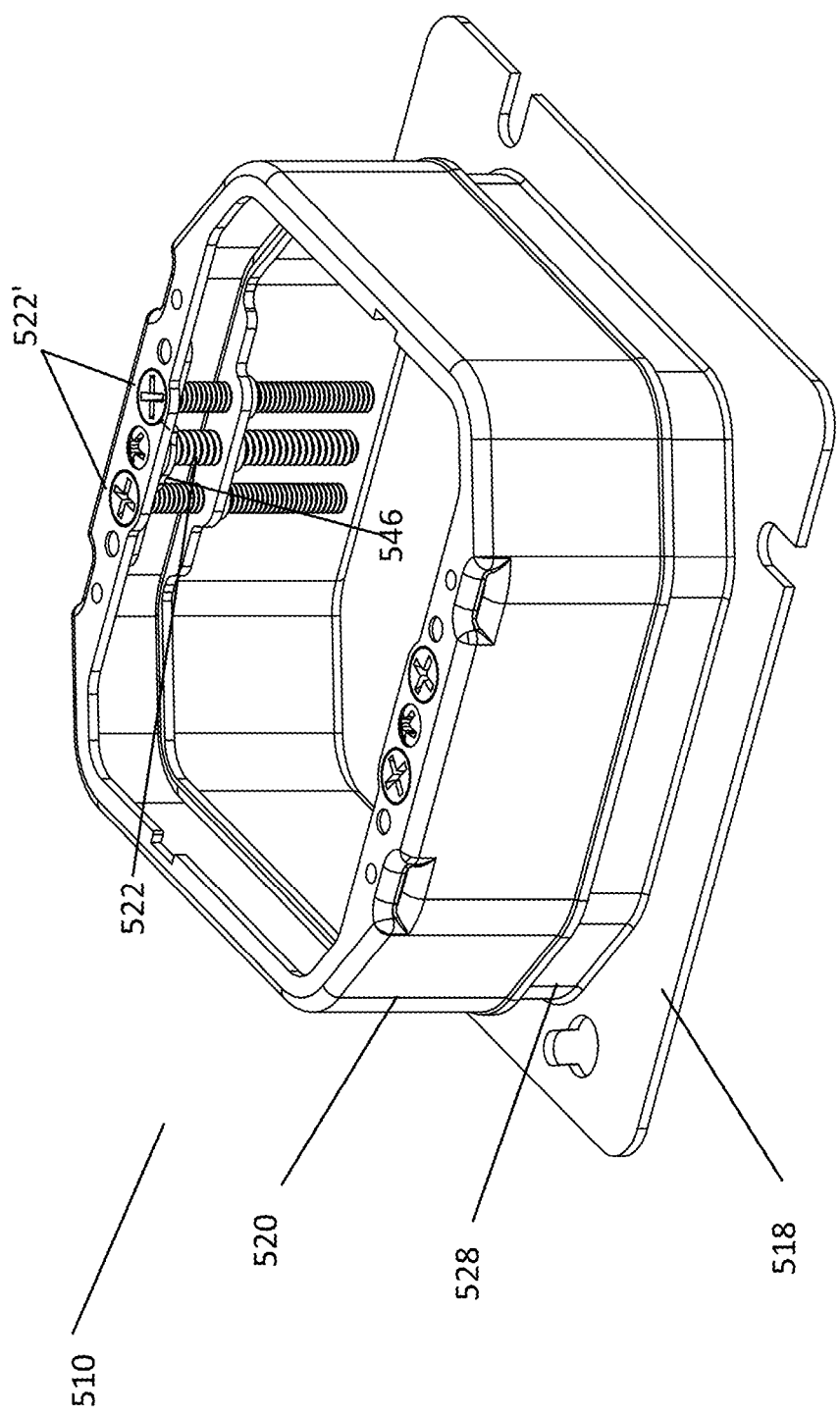
FIG. 37 is a top perspective view of an exemplary embodiment of another adjustable mud ring assembly according to the present disclosure.

Referring now to FIGS. 14-15, another alternate exemplary embodiment of an adjustable mud ring assembly according to the present disclosure is shown and is generally referred to by reference numeral 310. Component parts having similar or analogous features are labeled in multiples of 300 to those in FIGS. 1-6.

Assembly 310 is configured much like assembly 210 namely for use with a double gang box (not shown) and with two electrical devices (also not shown). However, assembly 310 lacks has the alternate exemplary embodiment of the indexing screw retention member 146 described with respect to assembly 110 of FIG. 7.

Specifically, assembly 310 includes indexing screw retention member 346 that has clip 360 with retention tabs (not shown) and tightening opening 364. Retention member 346 also includes slots 366 defined in movable ring 320 adjacent indexing screw opening 344. Slots 366 receive the retention tabs to secure clip 360 to movable ring 320, with the shoulder (not shown) of indexing screw 322 held therebetween.

Accordingly, assembly 310, like assemblies 10, 110, and 210, is advantageously configured to allow the user to easily and repeatably locate the junction box on the support at a position that is within the allowable movement of movable ring 220 between its first and second positions, while preventing the movable ring 220 from protruding into the space of the junction box at the fully retracted position and ensuring that any screws that secure the electrical device in the movable ring extend into the space between the movable and stationary ring 328.

It should be recognized that the embodiments of the adjustable mud ring assemblies disclosed herein above included, by way of example only, base 18 having junction box connecting portion 24 and stationary ring 28 attached to or forming a common or integral member with support connecting portion 26. Of course, it is contemplated by the present disclosure for support connection portion 26 to be secured directly to or forming a common or integral member with junction box 16. Examples of this embodiment are now described with reference to the embodiments of FIGS. 16 through 41. To the extent that any of the aspects of the various embodiments disclosed herein are described separately, it is intended by the present disclosure for these aspects to be incorporated into one another in any desired manner.

Another exemplary embodiment of an adjustable mud ring assembly according to the present disclosure is shown in FIGS. 16-29 and is generally referred to by reference numeral 410. Component parts having similar or analogous features are labeled in multiples of 400.

Assembly 410 is shown securing electrical device 12 in junction box 14 and securing the junction box to support 16 with an exemplary embodiment of a support connecting portion 426 according to the present disclosure. Here, portion 426 is secured to junction box 14 and does not form an integral part base 18 as in the prior embodiments. Portion 426 provides assembly 410 with offset distance ($D_2$) as discussed above.

Assembly 410 is shown having portion 426 on two opposite edges, but of course, it is contemplated by the present disclosure for assembly 410 to have only one portion 426. Portion 426 can be integral to box 14, permanently secured to the box, or removably secured to the box in any known manner.

Assembly 410 includes base 418, movable ring 420, stationary ring 428, and indexing screws 422 (two shown). Indexing screw 422 is configured to move movable ring 420 between the first and second positions with respect to stationary ring 428. In this embodiment, movable ring 420 is external to or covers stationary ring 428. Here, base 418 can prevent movable ring 420 from passing into a space occupied by any exposed, live electrical contacts (i.e., within stationary ring 428 and/or junction box 14).

Assembly 410 includes an indexing screw retention member 446 secured to movable ring 420, which secures indexing screw 422 so that the shoulder of the screw is retained by the retention member and allows for movement of the movable ring 420 as disclosed above. In some embodiments, assembly 410 can further include a clamping screw 422' (two shown) that prevents movement of movable and stationary rings 420, 428 with respect to one another.

Here, clamping screw 422' is threaded through both rings 420, 422 so that the clamping screw must be loosened or backed off (FIGS. 21-22) to allow indexing screw 422 to move movable ring 420 with respect to stationary ring 428, at which time the clamping screw can be tightened (FIG. 23) to prevent further movement of the rings with respect to one another.

Of course, other embodiments of clamping screw 422' are contemplated by the present disclosure. For example, assembly 410 is shown in FIGS. 30-32 having an alternate embodiment of clamping screw 422". Here, clamping screw 422" is threadably received in stationary ring 428 and a nut or threaded member 423. Upon movement of rings 420, 428 with respect to one another to the desired position using indexing screw 422 (FIG. 31), clamping screw 422" is tightened until nut 423 abuts stationary ring 428 and prevents further movement of the rings with respect to one another (FIG. 32).

In some embodiments such as those shown in FIGS. 33-36, assembly 410 can further include an extension ring 470 removably secured to moveable ring 420 by one on more screws 472 (two shown). Extension ring 472 can include one or more locating tabs 474 that are received in openings 476 of movable ring 420.

It should be recognized that assembly 410 is disclosed in FIGS. 16-36 by way of example only as a single gang. Of course, it is contemplated by the present disclosure for the assembly to be configured as a double gang as shown in FIGS. 37-41, which is generally referred to by reference numeral 510. Component parts having similar or analogous features are labeled in multiples of 500.

Assembly 510 is shown securing an electrical device in junction box 14 and securing the junction box to support 16 with an exemplary embodiment of a support connecting portion 526 according to the present disclosure. Here, portion 526 is secured to junction box 14 and does not form an integral part base 18 as in the prior embodiments. Portion 526 provides assembly 510 with offset distance ($D_2$) as discussed above.

Assembly 510 is shown having portion 526 on two opposite edges, but of course, it is contemplated by the present disclosure for assembly 510 to have only one portion 526.

Assembly 510 includes base 518, movable ring 520, stationary ring 528, and indexing screws 522 (two shown) that move the movable ring between the first and second positions with respect to the stationary ring. In this embodiment, movable ring 520 is external to or covers stationary ring 528.

Assembly 510 includes an indexing screw retention member 546 secured to movable ring 520, which secures indexing screw 522 to allow for movement of the movable ring 520 as disclosed above. In some embodiments, assembly 510 can further include a clamping screw 522' (four shown) that prevents movement of movable and stationary rings 520, 528 with respect to one another.

Portion 526 can include one or more bendable supports 580 that can be bent into position to support the portion with respect to a wire, a stud, the wall board, other any other component.

Figure 41:
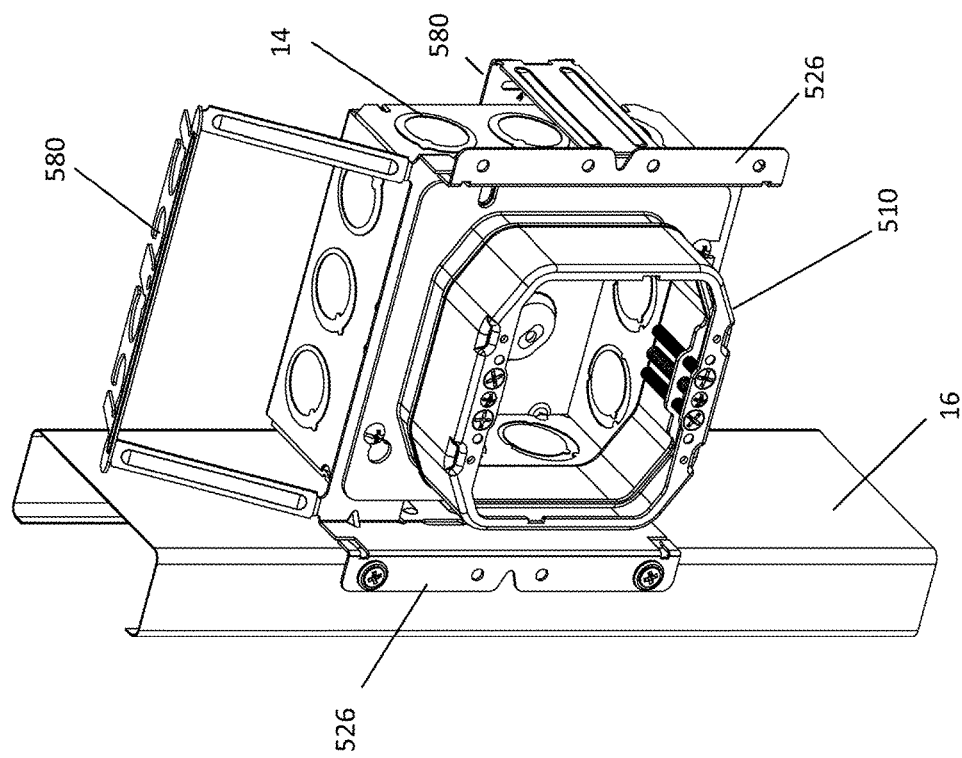
FIGS. 41-42 are top perspective views of another exemplary embodiment of a support connecting portion according to the present disclosure in use.
Figure 42:
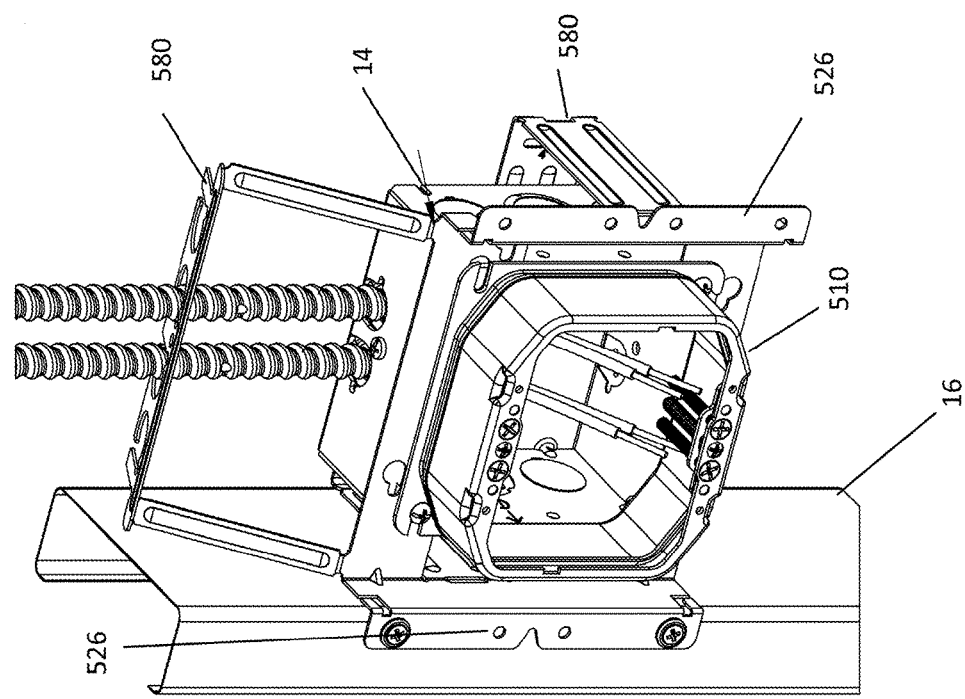

Assembly 510 and portion 526 can be secured directly to the support 14 as shown in FIGS. 41-42. Alternately and as shown in FIGS. 43-44, portion 526 can be configured for use with an open space bracket 590. Bracket 590 has ends 592 that can be secured to two supports 14 with portion 526 secured in any desired position therebetween. Bracket 590 can be configured so that a distance between ends 592 is adjustable to accommodate different distances between supports 14. In some embodiments, portion 526 can include one or more bendable tabs 594 that allow the portion to be secured in position on bracket 590.

The terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. An adjustable mud ring assembly comprising: a base member including a protruding portion; a movable member supported on the base member for movement relative to the protruding portion, the movable member including an opening; a clamp screw securing the movable member against movement relative to the base member; and an adjustment member positioned outside the opening of the movable member and coupled to the base member proximate one end of the adjustment member and coupled to the movable member proximate another end of the adjustment member, actuation of the adjustment member moving the movable member with respect to the base member between a first position and a second position.

2. The adjustable mud ring assembly of claim 1, further comprising a support connection portion for supporting the base member.

3. The adjustable mud ring assembly of claim 2, wherein the base member and the support connection portion are integral to one another.

4. The adjustable mud ring assembly of claim 2, wherein the base member and the support connection portion are each configured for connection to a junction box.

5. The adjustable mud ring assembly of claim 1, wherein the movable member is positioned within the protruding portion of the base member.

6. The adjustable mud ring assembly of claim 5, wherein the movable member is movable with respect to the base member to the first position without protruding, at a lowermost point, into a junction box while connected to a junction box connecting portion.

7. The adjustable mud ring assembly of claim 1, wherein the movable member extends around the protruding portion of the base member.

8. The adjustable mud ring assembly of claim 1, wherein the adjustment member includes a fastener, wherein the base member includes an indexing tab having a threaded opening that threadably receives the fastener, wherein threading the fastener relative to the threaded opening moves the movable member between the first and second positions.

9. The adjustable mud ring assembly of claim 1, wherein the base member further includes a biasing tab that is normally biased into contact with the movable member so that at least a portion of the base member remains in electrical contact with the movable member.

10. The adjustable mud ring assembly of claim 9, wherein the movable member includes at least one side contacting the biasing tab, the at least one side having a draft angle that, as the movable member is coupled to the base member, the movable member urges the biasing tab outwardly to simplify assembly.

11. The adjustable mud ring assembly of claim 1, wherein the base member further includes a first protrusion and the movable member further includes a second protrusion, the first and second protrusions forming a space sufficient to receive a screw that secures an electrical device to the movable ring.

12. The adjustable mud ring assembly of claim 1, wherein the movable member includes a fastener opening and a retention member, the adjustment member including a fastener received in the fastener opening in a rotatable manner, the fastener including a shoulder retained by the retention member.

13. The adjustable mud ring assembly of claim 1, further comprising a support connecting portion including a bendable wire support depending therefrom.

14. The adjustable mud ring assembly of claim 1, further comprising an extension ring secured to the movable member.

15. An adjustable mud ring assembly comprising: a base member; a movable member supported for movement relative to the base member, the movable member surrounding at least a portion of the base member; a clamp screw securing the movable member against movement relative to the base member; and an adjustment member coupled to the base member proximate one end of the adjustment member and coupled to the movable member proximate another end of the adjustment member, actuation of the adjustment member moving the movable member with respect to the base member between a first position and a second position.

16. The adjustable mud ring assembly of claim 15, wherein the adjustment member includes a fastener, wherein the base member includes an indexing tab having a threaded opening that threadably receives the fastener, wherein threading the fastener in the threaded opening moves the movable member between the first and second positions.

17. The adjustable mud ring assembly of claim 15, wherein the movable member includes a fastener opening and a retention member, the adjustment member including a fastener received in the fastener opening in a threadable manner, the fastener including a shoulder retained by the retention member.

18. The adjustable mud ring assembly of claim 15, wherein the base member includes a plate, an opening extending through the plate, and a ring protruding from the plate and extending around the opening, wherein the movable member surrounds the ring and is movable in a direction parallel to an axis of the opening.

\* \* \* \* \*